US009767263B1

(12) United States Patent
McInerny et al.

(10) Patent No.: US 9,767,263 B1
(45) Date of Patent: Sep. 19, 2017

(54) TURING TEST VIA FAILURE

(71) Applicant: Amazon Technologies, Inc., Reno, NV (US)

(72) Inventors: Michael James McInerny, Seattle, WA (US); Mark Evans Brighton, Seattle, WA (US); Sevag Demirjian, Seattle, WA (US); Blair Livingstone Hotchkies, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/500,800

(22) Filed: Sep. 29, 2014

(51) Int. Cl.
G06F 21/00 (2013.01)
G06F 21/31 (2013.01)
G06F 21/36 (2013.01)

(52) U.S. Cl.
CPC .............. *G06F 21/31* (2013.01); *G06F 21/36* (2013.01)

(58) Field of Classification Search
CPC ...................................................... G06F 21/36
See application file for complete search history.

(56) References Cited

U.S. PATENT DOCUMENTS

| 4,971,561 | A | 11/1990 | Krane |
| 6,732,112 | B1* | 5/2004 | Nagatomo ............ G06F 1/1626 |
| 7,904,517 | B2 | 3/2011 | Kang et al. |
| 7,945,952 | B1 | 5/2011 | Behforooz |
| 8,132,255 | B2 | 3/2012 | Mates |
| 8,495,518 | B2 | 7/2013 | Boden et al. |
| 9,105,034 | B2* | 8/2015 | Hamilton, II ......... G06Q 30/02 |
| 2005/0157662 | A1 | 7/2005 | Bingham et al. |
| 2007/0026372 | A1 | 2/2007 | Huelsbergen |
| 2008/0207316 | A1* | 8/2008 | Burnett ............. G06Q 30/0239 463/29 |
| 2009/0241174 | A1 | 9/2009 | Rajan et al. |
| 2009/0249477 | A1 | 10/2009 | Punera |
| 2009/0319271 | A1* | 12/2009 | Gross ...................... G10L 17/26 704/246 |
| 2010/0082998 | A1* | 4/2010 | Kohavi ................... G06F 21/36 713/182 |
| 2010/0106671 | A1* | 4/2010 | Li ........................... G06N 5/04 706/46 |
| 2010/0162404 | A1 | 6/2010 | Dawson et al. |
| 2010/0262462 | A1 | 10/2010 | Tryfon |
| 2011/0178831 | A1* | 7/2011 | Ravichandran ........ G06Q 10/06 705/7.11 |
| 2012/0158503 | A1* | 6/2012 | Mardikar ........... G06Q 30/0269 705/14.53 |
| 2012/0159586 | A1 | 6/2012 | Carney et al. |
| 2012/0166409 | A1 | 6/2012 | Saxena et al. |
| 2012/0222100 | A1 | 8/2012 | Fisk et al. |

(Continued)

*Primary Examiner* — Ali Shayanfar
(74) *Attorney, Agent, or Firm* — Davis Wright Tremaine LLP

(57) ABSTRACT

Current CAPTCHA tests are designed to be difficult for a bot and simple for a human-user to answer; however, as artificial intelligence improves, bots are more capable of using techniques such as optical character recognition to resolve current CAPTCHAs in similar manners as human-users. By providing a CAPTCHA challenge from a library or set of challenges that are designed in a manner that causes or likely causes a human-user to trivially get the answer to the challenge wrong, helps to confirm that a user is a human-user, as a bot would answer the challenge correctly.

23 Claims, 10 Drawing Sheets

(56) References Cited

U.S. PATENT DOCUMENTS

| | | | |
|---|---|---|---|
| 2012/0246008 A1* | 9/2012 | Hamilton, II | G06Q 30/02 |
| | | | 705/14.66 |
| 2012/0246737 A1 | 9/2012 | Paxton et al. | |
| 2013/0019286 A1 | 1/2013 | Barborak et al. | |
| 2013/0036360 A1* | 2/2013 | Hallsten | G06Q 10/10 |
| | | | 715/738 |
| 2013/0145314 A1* | 6/2013 | Dhar | A61B 6/4405 |
| | | | 715/803 |
| 2013/0160098 A1 | 6/2013 | Carlson et al. | |
| 2013/0276125 A1 | 10/2013 | Bailey | |
| 2014/0196133 A1 | 7/2014 | Shuster | |
| 2014/0273987 A1 | 9/2014 | Price | |
| 2014/0317744 A1* | 10/2014 | Turgeman | H04L 63/1408 |
| | | | 726/23 |
| 2015/0067848 A1* | 3/2015 | Baikalov | H04L 63/1491 |
| | | | 726/23 |
| 2015/0156084 A1* | 6/2015 | Kaminsky | H04L 43/04 |
| | | | 709/224 |
| 2015/0180829 A1* | 6/2015 | Yu | G06F 21/31 |
| | | | 726/11 |
| 2015/0381652 A1 | 12/2015 | Wardman et al. | |

* cited by examiner

US 9,767,263 B1

TURING TEST VIA FAILURE

BACKGROUND

Various technical measures and practices exist for excluding or hindering automated-agents from accessing website content by implementing techniques such as blocking an Internet protocol (IP) addresses, disabling web services, blocking automated-agents based on excessive traffic monitoring, attempting to learn automated-agent behavior, implementing reverse Turing test, using Completely Automated Public Turing test to tell Computers and Humans Apart (CAPTCHA) or other human interaction proofs. Conventional techniques, however, are often prone to misapplication, such as by inhibiting legitimate access, thereby causing a poor user experience. A CAPTCHA is a computer program that generally protects a website against automated-agents or bots by generating and grading tests that human-users are generally able to solve but current computer programs cannot.

Programmers that are willing to expend enough resources, however, can compromise even these more sophisticated CAPTCHAs, such as the ones that use photographs. Modern tests remain susceptible to compromise because, among other problems, the tests suffer from limited vocabularies, i.e., the images that are available for the tests originate from finite image and/or relatively small libraries. For example, if there are 10,000 images for a particular test, a programmer wanting to solve that test merely needs to solve the 10,000 images with humans and record the results. The programmer could then generate short-hand numerical representations for each image in the test, such as a hash key, that could be used by a computer program to automate the process of solving the test. The computer program may, for example, compare the numerical representations against images appearing in the test in order to properly identify the images. Consequently, even modern CAPTCHAs that use images are susceptible to being compromised through automated attacks.

BRIEF DESCRIPTION OF THE DRAWINGS

Various embodiments in accordance with the present disclosure will be described with reference to the drawings, in which.

DETAILED DESCRIPTION

Figure 1:
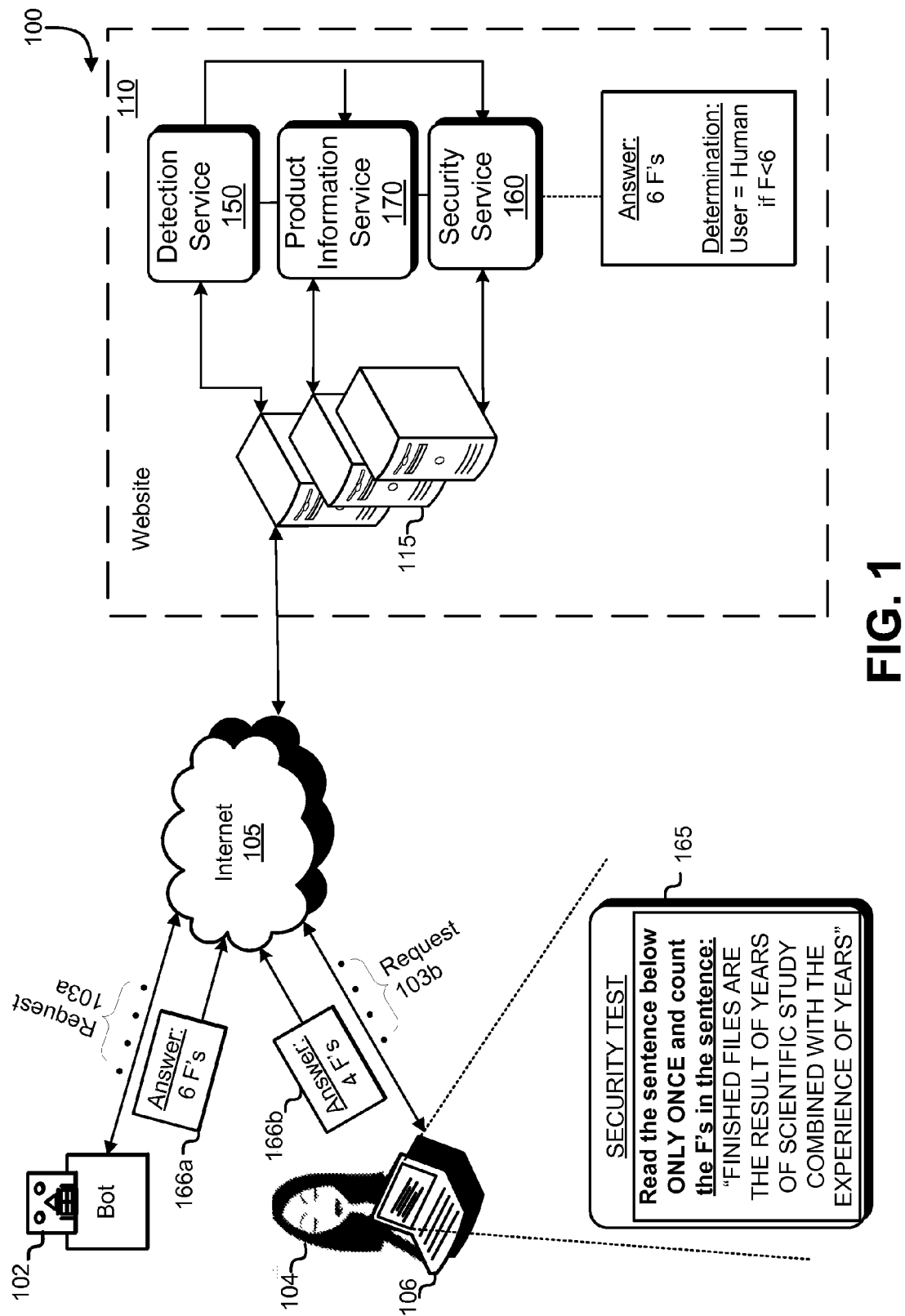
FIG. 1 is an illustrative example of an environment showing an online retailer system in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for differentiating between human-initiated requests and automated-agent-initiated requests received at one or more servers of a system in which, at least in some contexts, interaction with the system by automated-agents is undesired. A system, such as an online retailer, is used extensively throughout for the purpose of illustration; however, the techniques described herein are generally applicable to systems that receive or have the potential to receive requests from automated-agents. In this particular example, the online retailer operates an online or electronic marketplace from which customers may purchase goods, services, and/or other items. Example embodiments presented herein are drawn to creating security problems, also referred to as challenge-response tests or CAPTCHA challenges, directed toward determining if the user is an automated-agent, such that a successful answer to a security problem implies that the user is an automated-agent, and not a human-user.

According to some example embodiments, a new form of security test, referred to herein as an inverse or negative CAPTCHA is used, whereby the inverse CAPTCHA is testing to determine if an automated-agent correctly solves the challenge and a human-user is more likely to fail the challenge than an automated agent. In other words, the inverse CAPTCHA challenge is testing for a user being a human-user or an automated-agent by presenting a problem that humans are more likely to answer incorrectly, while automated-agents are likely to correctly solve the challenge or fail the challenge in a way that is distinguishable from human performance failure.

Computers can be programmed to correctly solve complex logic problems, or at least provide reliably and/or predictably incorrect answers to such problems. By providing inverse CAPTCHA challenges in response to a request for a webpage, the determination that the user is a human-user or an automated-agent is confirmed by leveraging a set of tasks that are configured to be performed reliably badly by humans, thereby resulting in a determination that a user is a bot if the user successfully fulfills the challenge.

Such inverse CAPTCHA challenges may be gathered from sets of problems or libraries maintaining tests that human-users often answer incorrectly and can be used to create one or more systems for generating tests of human failure, which when answered correctly, would indicate the likelihood that the user is a bot. Framing the inverse CAPTCHA challenges in a manner that leads human-users to fail the challenge and automated-agents to pass the challenge enables a system administrator of the website to learn when bots are making the requests for a webpage and may then block the bot from continuing to access the webpage or perform another action.

Over time, programmers may recognize that the inverse CAPTCHA challenges are being used to block or screen bots that correctly solve the challenge, which may lead to bots being programmed to intentionally answer the problem incorrectly in an attempt to appear as a human-user and circumvent the inverse CAPTCHA. However, it is unlikely that a bot could be programmed to answer the question or challenge incorrectly in the same manner as a human-user, because predictably reliable inconsistent performance is a uniquely human characteristic that is currently unavailable to be "taught" to a bot. In other words, even if a bot were intentionally programmed to fail an inverse CAPTCHA challenge, the type of answer provided by the bot would likely be inconsistent with the type of incorrect answer provided by a human-user.

In some example embodiments of an inverse CAPTCHA, a human-user may respond to the challenge correctly causing a false positive (e.g., that the response was generated by a bot because the challenge was successfully solved, leading to a human-user being blocked or failing to receive the requested webpage). In order to address possible failures such as false positives, the security problem may be implemented in multiple steps or activities over a user's session; such a security test is referred to herein as a personality CAPTCHA. For example, a system administrator may compile evidence as to whether the user is behaving more like a human-user or an automated-agent by gathering information of the user's performance or responses at different steps during the session, or different webpages accessed with different security questions present at different stages. Such personality CAPTCHAs, in some embodiments, take advantage of human psychological traits, such as the human tendency to provide different answers to the same question asked in different ways and the susceptibility of humans to optical illusions and other phenomena where a human brain can be tricked into perceiving (seeing, hearing, feeling, etc.) things different than they actually are. Whereas automated agents do not have such tendencies and susceptibilities and such tendencies are difficult, if not impossible, to program.

FIG. 1 is an example embodiment of an environment 100 for implementing aspects in accordance with various embodiments. As will be appreciated, although an Internet environment 100 is used for purposes of explanation, different environments may be used, as appropriate, to implement various embodiments. More specifically, FIG. 1 shows an environment 100 in which users can connect to a website 110 through one or more computing devices, such as computing device 106, which may be referred to as the requesting device or requestor. The requestor 106 may include personal computers, smartphones, tablets, or any other computing device capable of connecting to the website 110.

The website 110 may include one or more webservers 115, which are operably interconnected with one or more services for providing website security, specifically, security against automated-agents. The website may receive requests 103a-b for network resources from a user of the website, such as the human-user 104 via the computing device 106 or the automated-agent 102 via the Internet 105. The website may have a request service or other routing service, which is a component of the one or more servers or is operably interconnected thereto in order to receive directly or indirectly, e.g., via interception, requests for webpages, such as requests 103a and 103b.

The computing device 106, or program in the case of a bot, may transmit one or more HTTP requests to webservers 115 of the website 110. The webservers 115 may be a collection of computing resources collectively configured to receive HTTP requests and direct the HTTP requests to one or more other services of the website. The webservers 115 or components thereof may direct requests using HTTP redirect or other routing techniques. The webservers 115 may be configured to direct requests to the appropriate service of the website 110 for processing. The webservers 115 may stream and/or transmit user requests to the detection service 150.

The detection service 150 may be a collection of computing resources collectively configured to receive requests and calculate, based at least in part on information corresponding to the requests, a score corresponding to the probability or likelihood that the requests were generated by an automated-agent. The detection service 150 may receive the requests or copies of the requests and determine a probability of a particular request being generated by an automated-agent. The detection service 150 may determine the probability of a particular request being generated by an automated-agent contemporaneously with receiving the request from the webservers 115. The detection service 150 may also redirect the request to the security service 160 based at least in part on the probability of the request being generated by an automated-agent.

The webservers 115 may receive information from the detection service 150 corresponding to the requests transmitted from the users. The webservers 115 may then redirect the requests based at least in part on the information received from the detection service 150. For example, the webservers 115 may receive information from the detection service 150 indicating that one or more requests may have been transmitted by an automated-agent. The webservers 115 may then redirect at least one of the one or more requests to the security service 160. The security service 160 may generate a security check configured to determine if the request was generated by a human or an automated-agent.

The security service 160 may be a collection of computing resources collectively configured to generate security checks capable of distinguishing humans from automated-agents. The security service 160 may generate the security check based at least in part on information received from one or more other services such as a product information service 170. The product information service 170 may generate information corresponding to goods and services offered by the website 110 as well as information corresponding to users 102 and 104 of the website 110. The product information service 170 may maintain information corresponding to particular products and the particular products classification. For example, the product information service 170 may maintain a catalog of product images and the corresponding product classification. The security service 160 may incorporate information from the product information service 170 into one or more security checks. For example, the security check may contain a series of challenges designed to identify if the user is a human-user or an automated-agent based on the user failing to solve the challenge, thereby implying the user is a human-user.

In some example embodiments, the security service 160 may also be offered as a service to one or more users or organizations of users such that the one or more users or organizations of users may mitigate automated-agent activity. For example, an organization may operate a website using one or more computing resources of the website 110, the website 110 may further offer the security service 160 and/or the detection service 150 as a service to the organization. The organization may then provide security checks to users of the website in order to differentiate human-users of the website and automated-agents as described in the present disclosure. Users of the website may consent to allowing the website 110 and one or more users or organizations of users to share information corresponding to the users of the website. This information may be used by the security service 160 to generate security checks.

Although the detection service 150, security service 160, and product information service 170 are shown as separate elements from the webserver 115 in FIG. 1, one or more of these services may be incorporated into the webserver 115 in accordance with the present disclosure.

For example, an inverse CAPTCHA may be presented to a user, via a user's client application, such as a web browser, as a graphical user interface (GUI) or an element of a GUI that requests certain information or responses before allowing the user to continue to interact or begin to interact with the requested webpage. In some embodiments, a user may request a resource via a Hypertext Transfer Protocol (HTTP) request for a particular webpage and a request service may be used to direct the request to a particular webserver responsible for rendering the webpage indicated by the HTTP request. The request service receiving the request may be configured to provide the request to a rendering service, which is responsible for processing the request and returning a response for the request. The rendering service may further be configured to determine if an inverse CAPTCHA challenge should be provided in response to the request and transmit the inverse CAPTCHA or other type of CAPTCHA to the user. Such a response may include Hyper Text Markup Language (HTML), JavaScript®, Cascading Style Sheets (CSS), executable instructions, or additional information suitable for causing the inverse CAPTCHA to be displayed for the user.

The inverse CAPTCHA challenge may be presented to the user, for example, it may be displayed in a modal window (also referred to as a modal dialog box or pop-up box), which may be a child window that requires the user to interact with the modal window before the user can continue to operate or interact with the parent application. However, if an inverse CAPTCHA is provided in the modal window and is correctly solved, then the user is presumed to be a bot and is block from operating in the parent application. Conversely, if the user fails to solve the inverse CAPTCHA, the user is presumed, generally, to be a human-user and is allowed to continue based on their request.

In the example embodiment of FIG. 1, a user 104 transmits a request 103b to the webserver 115 for a webpage of the website 110. In response to the request, the webserver may provide the user with a security test 165 in order to determine if the user is a human-user or an automated-user. The security test 165 is example of an optical illusion that humans generally solve incorrectly. Specifically, humans are generally not good at recognizing spelling errors or singular letters of words. For example, CAPTCHA 165 states that the user should read the sentence once and answer how many of the letter "F" exists into the response box. The sentence discloses: "Finished files are the result of years of scientific study combined with the experience of years." The average human will respond that there are only three or four "Fs"; however, there are six. The user 104, via the user's requesting device 106, sends a response 166b to the webserver, where the user answers "4." The webserver 115 may provide the user's response to the security service 160, which would determine that based on the user's incorrect response, the user is likely a human user. In such a scenario, the security service or other component may then render a webpage requested by the user's request 103b. Alternatively, the automated-agent 102, via the user's requesting device, sends a response 166a to the webserver, or other network component, where the user answers "6." The webserver 116 may provide a different response to the user's correct answer. The webserver may further take other actions or perform one or more operations in response to a correct score, such as blocking access to the requested resources, limiting access to the requested resources, logging the requested resources or changing the way the requests are logged based on the user being a bot, or similar actions that do not strictly deny access to the resources.

In some example embodiments, a determination that a user is a human-user versus an automated-user may not solely depend on whether the user answers the CAPTCHA correctly. For example, the user's 104 answer 166b that four F's are present, may be necessary but not sufficient to determine that the user is a human-user. A confidence score may be calculated based on preexisting statistics or metrics, such as knowledge that, for example, 85% of the time, a human-user will respond that there are four F's, 10% of the time, a human-user will respond that there are five F's, and 5% of the time, a human-user will respond that there are six F's. Based on these statistics, a confidence score may be created or added to that suggests the likelihood that the user is a human-user. Additional metrics may be used to create or add to the confidence score, for example, knowledge of the user, frequency of requests, time of day, geographical location, types of requests, etc.

Figure 2:
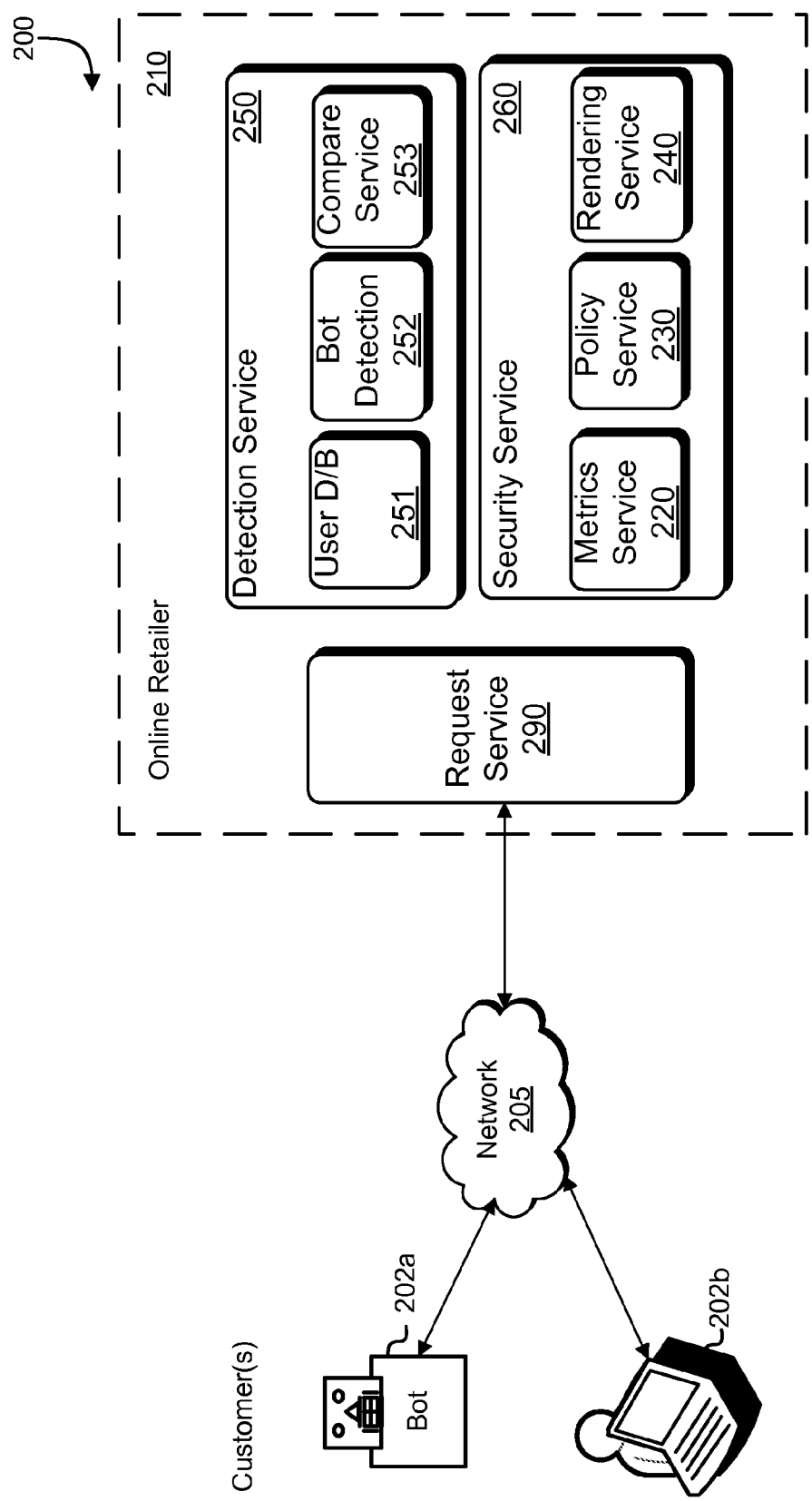
FIG. 2 is an illustrative example of an environment showing a security testing system in which various embodiments can be implemented.

FIG. 2 shows an environment 200 in which customers 202a-b may interact with an online retailer 210. The online retailer may operate a website that provides an online marketplace where customers 202a-b may purchase and offer for sale various goods and services. The customers 202a-b may transmit requests to access various resources of the online retailer 210. For example, customers 202a-b may, using a computing device executing a web browser, navigate the online retailer's website searching for a particular item. A request service 290 may provide the user requests to one or more services, such as a metrics service 220, a policy service 230, a rendering service 240, and/or a detection service 250; additional services may be interconnected according to the needs/desires of the system administrator.

Computing devices of users 202a-b may transmit data over a network to a request service 290 operated by the online retailer 210. The request service 290 may direct communications (also referred to as requests) from the users to the appropriate service of the online retailer 210. For example, the request service 290 may direct all webpage requests to a rendering service 240 in order to render and transmit the webpage in response to the request submitted by computing devices or program code of users 202a-b. The request service 290 may also transmit communications received from the users to a detection service 250.

The detection service 250 may contain one or more other services to enable detection of communications transmitted by one or more automated-agents. The detection service 250 may also receive information corresponding to the communications received from users 202a-b from the rendering service 240. The information may include signals received in response to webpages including CAPTCHAs, such as the inverse or negative CAPTCHA and/or personality or profile CAPTCHA described herein. Furthermore, the detection service may also receive information corresponding to cookies or other tokens submitted with the requests from users 202a-b.

The detection service 250, which may for example be implemented in hardware servers, that is configured to maintain a user database 251, a bot detection service 252, and a comparison service 253 for at least monitoring and recording information/data received from users, such as users 202a-b, detecting known or possible bots, and comparing previously recorded information with new requests. For example, the detection service 250 may receive a user request from a user previously determined to be a human-user and the user database 251 may be updated with new data or provide the new data to the comparison service 253 to determine if changes in a user profile or responses have occurred that may indicate the user is not a human-user, or may be used as a fraud detection method by determining that the previously determined human-user is now appearing as a bot. The detection service 250 may contain a real-time bot detection service 252, which may be a collection of computing resources collectively configured to track and record information and data collected in real-time or near-real time.

Further examples of the detection service 250 may also monitor requests over a period of time in order to determine the probability of the request being generated by an automated-agent. For example, the detection service 250 may monitor all of the requests from a particular customer's current session and determine the probability of the requests being generated by an automated-agent. The detection service 250 may determine the probability of a particular request(s) being generated by an automated-agent and associate the probability with the request. In various embodiments, the detection service 250 receives a copy of the request and returns, to the request service 290, the probability of the request being generated by an automated-agent and information identifying the request. The detection service 250 may transmit the request and the associated probability to the request service 290 and the request service 290 may determine how to process the request based at least in part on the associated probability.

The metrics service 220 may include business metrics, such as resources available and used based on the amount of traffic from users, page views, impressions, and the like. The metrics service may include or be operably interconnected with one or more databases for monitoring and recording said metrics. The online retailer webserver and/or request service may provide request data to a policy service. User metrics can be determined through specific monitoring of computing resources, such as traffic hits, in addition, metrics may be received with the responses or answers to a security test from a user.

The policy service 230 may be a collection of computing resources collectively configured to determine whether to include a security check in response to a request and the type of security check to include. For example, the policy service 230 may be a computer system configured with a set of rules that indicate one or more actions to perform based at least in part on the type of communications being received. The policy service 230 may receive a user request from the request service, webserver, or other component of the online retailer 210 in order to determine what, if any, security tests should be provided to the user prior to or contemporaneously with providing the user with the requested webpage. The policy service 230 may further be connected with a rendering system or service 240.

The rendering service 240 may receive information from the policy service 230 indicating one or more security checks to include in response to the request. For example, the policy service may indicate to the rendering service to include a non-blocking CAPTCHA, as described below in connection with FIGS. 3 and 4, in response to the request. The rendering service 240 may generate a webpage to transmit in response to the request. The rendering service 240 and/or the request service 290 may transmit the webpage to the computing device of the user. The request service 290 may then transmit a signal received in response to the webpage back to the rendering service 240 or request service with the user's response. The rendering service 240 and/or the policy service 230 may be operably interconnected with a security service (described below in connection with FIG. 2), which may be configured to determine, create, and/or render appropriate security tests, such as an inverse CAPTCHA or personality CAPTCHA according to example embodiments presented herein.

Figure 3:
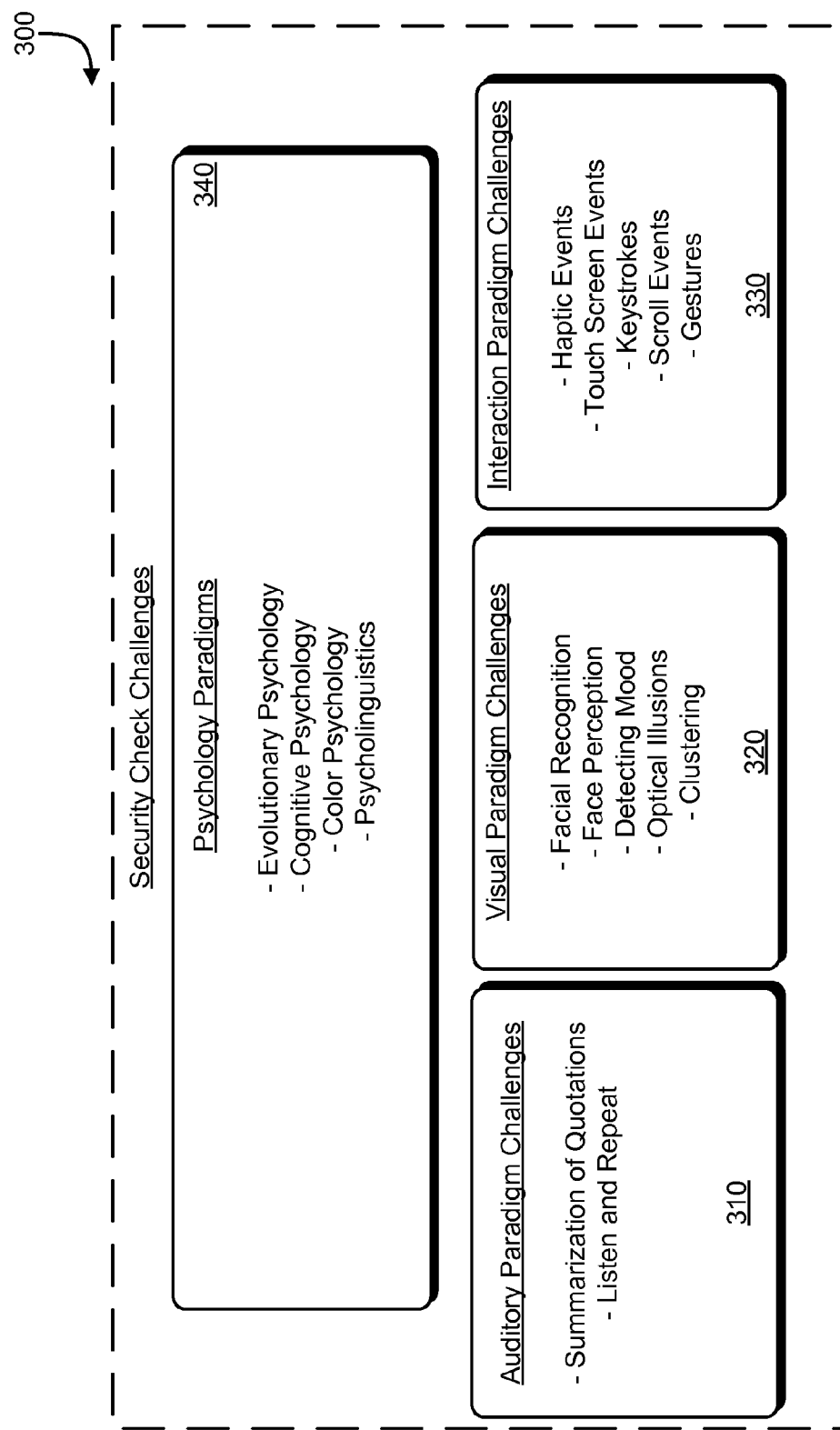
FIG. 3 is an illustrative example of block diagram showing multiple security testing paradigms in accordance with at least one embodiment.

FIG. 3 is an illustrative example of a block diagram displaying different types of security check challenges 300. Example embodiments may include auditory paradigm challenges 310, visual paradigm challenges 320, interactive paradigm challenges 330, and psychology paradigms 340. The auditory paradigms may include, for example, summarizing a quotation and playing the audio recording to a listener and requiring the listener to answer a question about what they heard or to type the words or sounds they heard. Visual paradigms may consist of facial recognition, face perception, detecting moods of persons, viewing optical illusions, and requiring the user to create clusters based on provided objects. Interactive paradigms may include feedback or user input that involves actions or movements other than the use of the keyboard. For example, a touch screen event, a scroll event of a mouse or stylus, gestures made by the human-user of the device, such as waving a hand over a sensor, and haptic events, such as the feedback of a vibration on a handheld device or a mouse.

Further example embodiment of inverse CAPTCHAs and personality CAPTCHAs as descried herein, may include using psychological paradigms for creating and determining useful security check challenges; primarily those that human beings believe that they are good at performing, but in actuality, fail in a consistent and usually predictable manner. For example, color psychology, psycholinguistics, evolutionary psychology, and cognitive psychology, to name just a few, are areas of psychology that study the human brain, memory, and functionalities that are useful in determining if a user is a human.

A computer program or bot may have a certain capability and a human-user may have a certain capability, but the performances between a bot and a human-user will have many variances in their respective capabilities. For example, a computer program may be able to solve a problem with a greater rate of speed than the human-user, but both users solving CAPTCHAs or other security tests, whether the answers are correct, incorrect, fast, slow, repetitive, etc., each response provides information and data to further detect the differences between human-users and bots.

Generally, automated-agents and human-users will perceive and solve problems differently; as such, there are specific types of security tests that are more compatible with a human-user succeeding and others that are more compatible with a bot succeeding. For example, facial recognition and summarization are currently tasks at which humans are superior to bots. On the other hand, color detection and optical illusions are more likely to be solved correctly by a bot than a human-user.

One example of this would be the Müller-Lyer illusion, which is an optical illusion consisting of stylized arrows, or a variation on the illusion providing line segments, in which the user is told to determine which arrow or line segment is longer, when in actuality, the length is the same. The checker shadow illusion is another example of a color test that depicts a checkerboard with light and dark squares and images rendered in a 2-dimensional plane and a 3-dimensional projection with two squares being the same color. Human-users generally perceive the two squares as being different colors or shades of the same color. In this test, human-users are likely to fail because of the way in which a human's visual system needs to determine the color of objects in the world. As with many so-called illusions, this effect really demonstrates that the human visual system is not very good at determining certain things, such as length or color in certain circumstances. However, these are variables for which a computer or automated-agent is well suited.

In some embodiments, a timing mechanism may be used in combination with the security question, such as the inverse CAPTCHA or personality CAPTCHA, in order to measure the speed of a user's response, encourage human-users to respond quickly without putting too much thought or effort into the response, determining challenges that human-users are faster at responding, and other desirable and useful ways to use time to evaluate a user. If the average user takes 2-10 seconds to respond to a CAPTCHA challenge, shorter time limits may be set in order to force the user to finish the challenge; as a bot will finish quickly no matter what the question is, generally, it is possible to determine a user is a human-user by recording the times a user does not answer the challenge at all, likely indicating that they are a human-user.

In other circumstances in which a bot may be programmed in an attempt to pass an inverse CAPTCHA, a timing component could be implemented in order to force a response to the challenge within a specific period of time. The time element would cause the human-user to almost always fail, but a bot would almost always pass as the computer program has increased computing power, resources, and speed. Alternatively, a timer element may cause the bot to fail when the bot is employing an Application Programming Interface (API). For example, programmers or bot developers may try to implement API requests or calls to receive return responses that indicate success or failure. However, if an inverse CAPTCHA is paired with a timer activity, the time restriction to provide a response may hinder the bot from making the API call. Further, the timer activity forces the human-user to respond to the inverse CAPTCHA quickly, which will likely lead to the human-user responding incorrectly, save perhaps for a lucky guess or a preexisting knowledge of the question.

Security challenges for use in CAPTCHAs, inverse CAPTCHAs, personality CAPTCHA, etc. may be difficult to create when faced with the task of creating a problem that human-users generally answer incorrectly may be more complicated than creating typical CAPTCHA images. Security challenges may come from programmatically generating iterations of problems based on one or more initial rules. For example, an image of a gray shirt against a gray background may be presented to a human-user for testing the challenge. When a human tester fails the test of recognizing the gray shirt is the same color gray as the background, those factors, e.g., the colors of the shirt and background, may be programmatically changed based on, for example, brightness, levels, pigment, etc., and hundreds of thousands of the same type of optical illusion inverse CAPTCHA may be created.

Alternative example embodiments may include creating permutations of the same problem and generating hundreds of thousands of problems within certain classes of problems. For example, problems focusing on shape, color, distortion, directionality, or determining unambiguous tasks versus ambiguous tasks.

Figure 4:
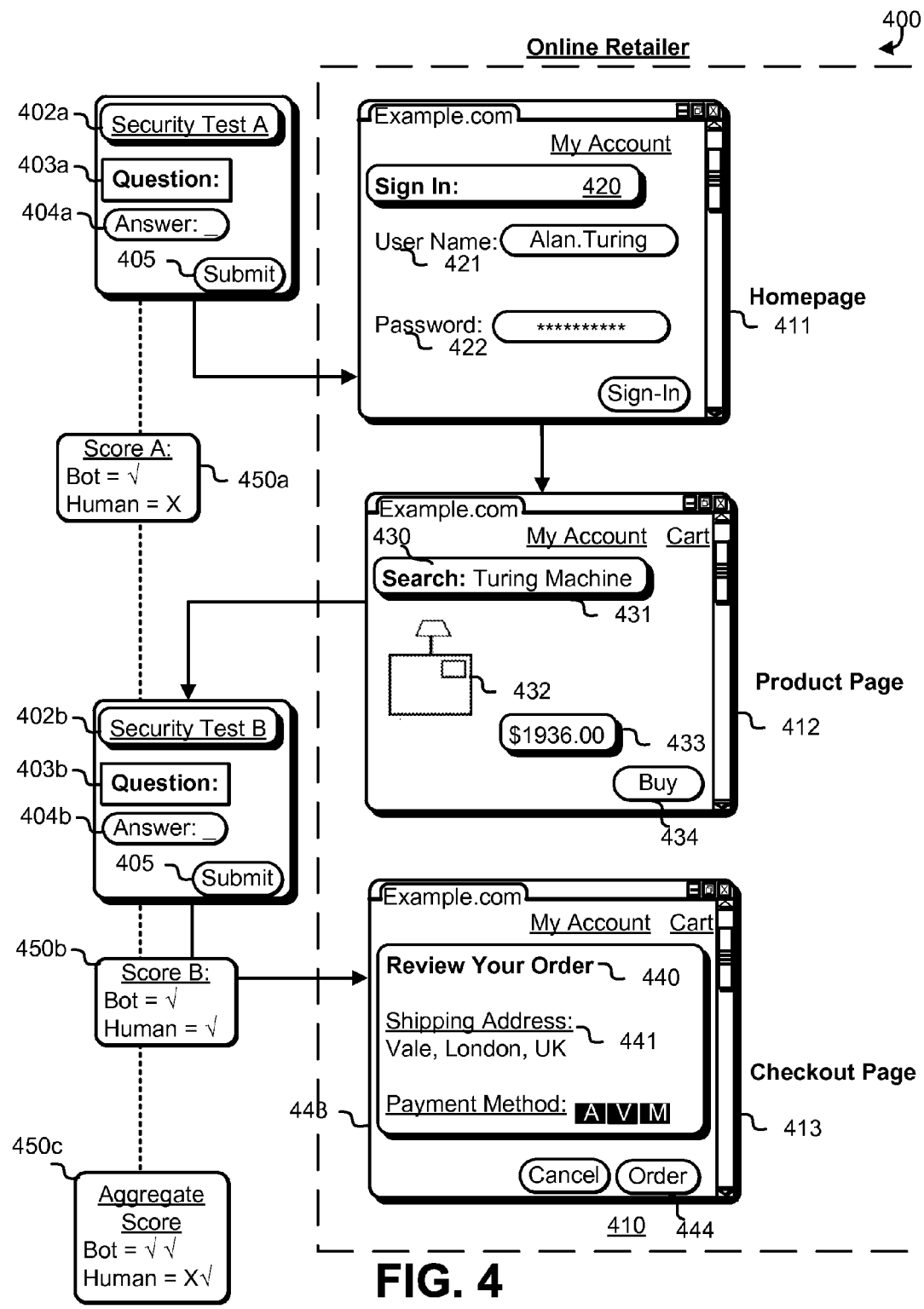
FIG. 4 is an illustrative example of a block diagram for a security testing system for an online retailer in accordance with at least one embodiment.

FIG. 4 is an example embodiment of multiple security challenges 400 being provided to a user during different activities in order to address multiple failure situations.

In circumstances where there is a repeated or continuous failure by the user to solve the CAPTCHA, multiple tests or series of steps of a test may be provided to the user while the user is completing some number of activities on a website, such a test is referred to herein as a personality CAPTCHA. For example, instead of providing a single security test, for some users, multiple challenges may be presented over multiple webpages in order to gather evidence as to whether the user is behaving more like a human-user and is failing more often like a human-user as opposed to a bot. The personality CAPTCHA may be used to determine if a user is a human-user or an automated-agent. A personality CAPTCHA refers to a challenge or question that is directed toward whom the human-user is, what does the user like, what has the user purchased in the past, what types of products does the user search for, how has the user answered challenges in the past, and other determinations about the user as an individual.

FIG. 4 illustrates multiple webpages in an environment 400 that include various graphical user interface elements to navigate between webpages of a website. In the instant example, webpages 420, 430, and 440 are all pages of an electronic marketplace of an online retailer 410. In this example, two security challenges are required in order for a user to first enter the homepage 411 and a second security challenge between a product page 412 and a checkout page 413. The first security test is an inverse CAPTCHA 402A, which is shown on a separate page from the homepage. Here, when the user requested the homepage of a website, of the retailer, a security administrator, or other controlling party, may have a security test been given to a user in a pop-up window. Alternatively, the inverse CAPTCHA may be provided in-line on the first requested webpage as a blocking CAPTCHA, which requires a successful response before the user is able to interact with the webpage. In the instant example, the inverse CAPTCHA 402a is a non-blocking CAPTCHA that may allow the user to continue operations with the webpage based on the user's request. The non-blocking CAPTCHA enables the system to acquire data about the way in which the user answered the challenge 403a, even if the answer 404a is incorrect.

When a user is provided with the requested webpage, as in webpage 4011 of a website of an online retailer 410, the user may use a sign-in page 420 by providing the user name 421 and password 422 and sends a request to the server. A user is then provided with a product page requested 412 where the user may enter a search term 431 in a search field 430 of the webpage GUI 432. Once the user submits the buy button 434 on the GUI, the server provides the user a second CAPTCHA test 402b in response.

The user, upon receipt of the second CAPTCHA Test B 402b, is required to respond to question B 403b by typing in the user's response in the answer box 404b of the GUI and submitting the response to the server via a submit button 405 of the GUI before the checkout page 413 will be provided. For example, when the user receives a first CAPTCHA test 402a and provides a response to the server, the response is recorded in a database or file, which can be used to create or add to a user profile or may be compared to other CAPTCHA responses, such as the user's response to CAPTCHA B 402b.

A server, such as server 115 described and depicted in connection with FIG. 1 or a component thereof, may compare the two responses from the user to use as evidence to determine if the user is a human-user or a bot. If, for example, the CAPTCHA test was a Wason Selection Task Challenge as described above, the server would determine if the user answered both questions equally well or equally poorly, in which case the user is likely a bot, or determine if the user answered one CAPTCHA successfully and failed to answer the other question successfully, which would be interpreted as the user being a human-user.

In some example embodiments, when a user is determined to be an automated-agent, such as the bot 480, the server may, instead of responding to the user with the requested page, respond with an error message 404 or otherwise block the bot from successfully receiving the webpage initially requested. However, if the user is determined to be or likely a human-user, such as the human 470, the server may respond to the user's request to buy the product 431 and provide the user with a checkout page 413 where the user may review the order 440 on a GUI of the webpage, enter a shipping address, 441, a billing address 442, and a payment method 443 and complete the purchase by selecting the GUI element place order button 444.

A score or tally may be maintained by the webserver or a component of the network, such as a score to security test A 402 and a score to security test B 402b. For example, after the user enters a response to security test A 402a, a score A 450a is updated where the bot passes or correctly answers the test and the human user fails the test. After the user responds to security test B 402b, the score B 450b is updated where both the bot and the human-user respond to the test correctly.

A score may be determined after each test, or some portion of the tests, and there may be one or more tests provided to the user. Based on the scores, an aggregate score 450c may be calculated. The score may be binary or rated on a determined scale. The sore may be continuously or periodically created and/or updated in real-time or near real-time after each question is responded to by the user. The score may further be associated with a user profile that may be created and/or updated as data related to the user is collected. The score may further be used as an element of a confidence score, described in connections with FIGS. 1 and 8, or may be used as the confidence score on its own.

An example of a personality CAPTCHA may use evolutionary psychology to test the user, where evolutionary psychology relates to the human brain's ability to detect and deal with cheating in social exchanges and considers/postulates that once humans became good at cheating, they had to become good at detecting cheating. The classic example of these puzzles is known as the Wason Selection Task, which explains the human brain's ability to use deductive reasoning with a logic puzzle. Humans tend to do well on this task if it is presented in one way, and do poorly if it is presented another way. For example, a user is given two different versions of the same logic puzzle:

Version 1: The user is given four cards. Each card has a number on one side and a letter on the other. The user is told to indicate only the card or cards the need to be turned over to see whether any of these cards violate the following rule: If a card has a D on one side, it has a 3 on the other side; e.g., cards labeled "D," "F," "3," and "5."

Version 2: The user is told the following: You are a bouncer at a bar. You must enforce the rule that if a person is drinking beer, then he must be over 21 years old. The four cards below each represent one customer in your bar, one side of the card shows what the person is drinking, and the other side of the card shows the drinker's age. Pick only the cards you definitely need to turn over to see if any of these people are breaking the law and need to be thrown out; e.g., cards labeled "Beer," "Soda," "25," and "17."

The answer to Version 1 is D and 5. The answer to Version 2 is beer and 17. If a human-user if given these tests, they generally fail Version 1 and solve Version 2. Studies consistently show that in tests of the first sort, about 25% of people choose the correct answer. But 65% of human-users get test number two correct. What the Wason Selection Task exhibits is that both tests involve precisely the same logic: If P, then Q. Yet putting this statement in terms of social rules makes it far easier for human-users to solve than if it is purely descriptive. The computer would have done equally as well or equally as poorly across in either of these problems regardless of the framing. But a human-user will do consistently better with one framing than another, even though the actual logic is the same.

A personality CAPTCHA may be implemented as a multi-step security problem and include presenting a first challenge framed as a logic problem and a second challenge framed as a detection challenge, for example, to detect a cheater. For example, a bot would perform equally poorly or equally well at both steps of the problem, as both problems are identical, only the questions are framed in different contexts such that the words being used to describe the problems are different, but the action and actual logic is the same. In a multiple step CAPTCHA challenge such as this, the human-user will generally perform poorly on one step and well on the other step. A system administrator may review the responses and check for predictably reliable inconsistent performance as an indicator that the user is a human-user.

A personality CAPTCHA may include, for example, monitoring a user's interactions with the website and creating a personality CAPTCHA profile that is constantly evolving the more the user interacts with the online retailer website. Personality CAPTCHAs may use different areas of human interaction and characteristics to narrow a user's profile and enhance the security of a website by gathering details about the user that will help make more focused and targeted personality CAPTCHAs the more the user requests webpages or resources from that website or related websites or services. For example, personality CAPTCHAs may use or may be created at least in part on psycholinguistics, which is a study of the psychological and neurobiological factors that enable humans to acquire, use, comprehend, and produce language. Psycholinguistics can also include studies of cognitive processes and abilities such as, for example, perception, attention, memory, motor function, visual and special processing, and other human executive functions.

Personality CAPTCHAs may further be configured to use color psychology, which is the study of color as a determinant of human behavior to direct CAPTCHA questions and puzzles for specific users based in part on a user's color preferences and the user's association between color and mood. Personality CAPTCHAs and inverse CAPTCHAs may further be configured to use evolutionary psychology, which is an approach and study of psychological traits such as memory, perception, and language.

In alternative example embodiments, additional CAPTCHAs or security tests may be provided to the user before or after any action taken by the user as desired by the system administrator or other controlling party.

A webserver or component thereof may further require an additional CAPTCHA to be solved if the user cannot be determined to be a bot or a human-user with enough certainty. The system administrator may configure the system to use a scale or rating system to determine confidence levels as to the user. The additional security tests may be required in order to further determine if the user's responses are likely those of a human, by determining, for example, if the user is consistently and reliably failing at challenges where humans are supposed to fail.

Figure 5A:
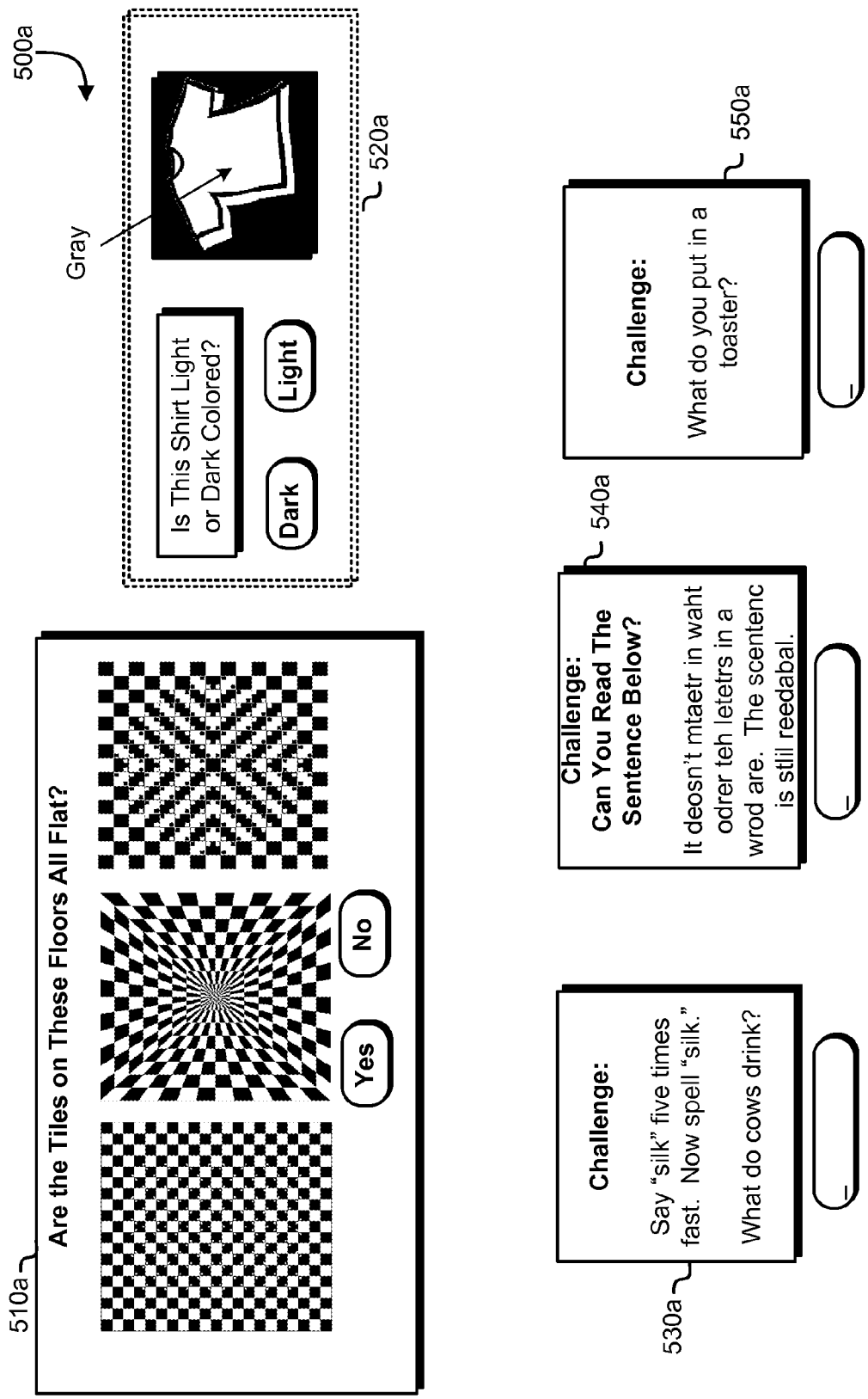
FIG. 5A is an illustrative example of a block diagram showing multiple types of CAPTCHA challenges in accordance with at least one embodiment.

FIG. 5A illustrates an example embodiment of multiple security test 500a to be provided by an online retailer in order to determine the likelihood a user is a human-user or an automated-agent. The security tests 510a, 520a, 530a, 540a, and 550a may be used by a system to determine a likelihood that a user is a human or a bot by providing CAPTCHA challenges that humans will generally fail or respond in consistent manners. For example, CAPTCHA 510a is a visual CAPTCHA providing three optical illusions and asks the user to press "yes" or "no" based on the question. An optical illusion takes advantage of the human brain's inability to solve visual processing problems, generally, as it is commonly solved by considering certain assumptions. For example, if a user was provided with two pictures, the first is a picture of white snow in a dark room and the second is a picture of black coal in a light room. The snow in the dark room is actually the same color as the coal in the light room; however, a human-user would generally perceive the coal to be darker because the human-user is taking assumptions based on the a priori knowledge of the colors of snow and coal in normal lighting. As such, a human-user responding to certain questions related to color perception is likely to get the answer wrong due to pre-existing knowledge being improperly applied.

Security test 520a, where the depicted shirt is gray, is similarly attuned to a human's perception of color. The user is told to look at a picture and choose a button if the shirt is dark or the other button if the shirt is light. In the context of the CAPTCHA, a human-user will not generally be able to tell if the shirt is a light color or a dark color depending on the context of the picture if the background color and object color are seemingly similar. However, a bot will search for each color's RGB value and determine the colors are the same.

Security test 540a is a similar optical illusion that reflects that humans do not need to read each letter of a word to understand the word. CAPTCHA challenges 530a and 550a are questions that are geared at tricking the human brain based on psycholinguistics principles of perception and language. CAPTCHA 530a asks the user to speak the word "silk" five times and then spell the word silk. Then the user must answer "what do cows drink?" in the response box. The average user, unaware of this type of illusion, will generally type in "milk." Similarly, CAPTCHA 550a asks a user "what do you put in a toaster?" Again, a human-user generally would type "toast" into the response box. On the other hand, a bot, if it was able to answer the CAPTCHA, would either respond with the correct words, i.e., "water" and "bread," respectively, or the bot would fail the CAPTCHA challenges in a manner different than the way in which a human-user fails the challenges.

In alternative example embodiments, many other forms of CAPTCHA challenges may be used, any of which could be used interchangeably or in a pattern or other method of confusing a human-user, leading the human-user to more likely fail. In example embodiments, a user may be presented with a security problem upon requesting a network resource from a provider; for example, a user requesting a product information webpage from an online retail server may receive a CAPTCHA challenge before receiving the requested webpage.

A server, such as a server for an online retailer, may be configured to provide CAPTCHA challenges to a user in response to the user's request for a webpage. For example, if a user is requesting a webpage for condolence cards, the CAPTCHA generating engine may be configured to generate a challenge with a positive or happy appearance, such as, a challenge to cluster happy puppies together when shown pictures or illustrations of happy baby animals. In such a CAPTCHA challenge, the user, if a human-user, may cluster the baby animals in any number of clusters, such as clustering according to color, shape, size, or breed, as humans tend to cluster according to certain ambiguous criteria, a bot will usually be unable to cluster the images in any discernable pattern.

For personality CAPTCHA challenges, a user may be given open-ended or ambiguous questions for security challenges. Human-users are able to comprehend open-ended questions in a manner that displays that the user is a human-user, where a computer program, while possible to still respond with an answer, the answer submitted by a bot would appear to be a random response, or possibly a response taken out of context. In such an example, a decision module configured to create and maintain user CAPTCHA profiles may record the bot's response as being inappropriate or incoherent. For example, a CAPTCHA challenge may display an open-ended question, such as "Mary has a little _____," and provide three images, a sheep, a lamb, and a goat. A human-user would likely choose "lamb," based on the child's riddle; however, a bot may not determine the three animals, being close in image and cluster, to have a specific meaning in light of the story. As such, the decision module may record the user's response according to the appropriateness of the answer based on the correlation between the story and the image, and determine that a user is likely a bot if the response is incongruent.

Alternative examples of a personality profile may include the use of audio recognition or summarization of a famous quotation or phrase, where a human-user is likely to consider a quote or gist of a quote to be correct even if it is not completely true, because humans are generally good at detecting the similarity or gist of a quote, even if not 100% correct. For example, if an audio clip recited "I don't think we're in Kansas anymore, Toto," and the user was required to enter the name of the movie where the clip was from, a human-user would enter "Dorothy" or "Wizard of Oz." However, that is not actually a real quotation, the true line from the movie was "Toto, I've a feeling we're not in Kansas anymore," and it has been misquoted so many times that the gist of the quotation remains. A human would therefore enter the name of the character or move, despite it not being true. Whereas a bot would likely be unable to solve the challenge, or respond with "inconclusive" or "unknown" as the clip was not true. A decision module would record the user's answer to the audio processing CAPTCHA according to appropriateness or likelihood of understanding a sentiment or gist of a misquoted line.

Such a paradigm could similarly be provided as a written CAPTCHA challenge, where words or numbers were flashed on the user's GUI and the user is required to enter what they recall viewing. For example, if 10 numbers were flashed on the interface, a human-user may only remember five or a percentage of the numbers, or place the numbers in an incorrect order, whereas a bot would be able to respond with the exact list of numbers. In such an example of a personality CAPTCHA, a decision module would record the user's response and determine that the user is likely a human-user if the response was incorrect or incomplete.

In another example embodiment of a personality CAPTCHA, a theory of face perception may be used, where face perception refers to a human's understanding and interpretation of a face, especially in relation to associated information processing in the brain. As face perception is a human neurological mechanism used to identify feelings without much context, this is an important mechanism for daily interaction. However, such a human trait is not easily, if at all, immutable to machine learning algorithms. For example, if three pictures were displayed on a user's GUI of three happy people, a user would be required to enter the word that describes the expression or three images of different facial expressions could be displayed, where one is happy and two are sad and the user would be required to click on the image that displayed happiness. In such an example, a human-user would generally be able to decipher the face perception quickly, while a bot would likely choose randomly from among the options, as bots do not have the artificial intelligence necessary to understand and interpret facial information.

Further example embodiments of personality CAPTCHAs may include interaction events other than typing an answer. For example, a personality CAPTCHA may require a user to use an input device, such as a mouse, and the CAPTCHA could simply state: Click the mouse five times. A user's response would be recorded by mouse-click events, which are not capable of being replicated by a bot. Other interaction events could include, for example, haptic response events, scroll events, touchscreen events, gesture events, sound events, speech events, or other non-key stroke events.

Alternative example embodiments of personality CAPTCHAs may include user-identifying questions directed toward identifying different users of the same account, detecting a mood of user, detecting a level of expertise of a user, detecting fraudulent user attempts, or similar uses of a user profile that indicates the user is a human user based on current and previous responses to security tests.

A personality CAPTCHA directed toward determining a specific user from among different users of a single account of the online retailer may be used for multiple purposes, such as security testing, profile creation and updating, marketing, and other information purpose. For example, if three members of a household use one account for the online retailer, each member likely has different interests, preferences, purchases, and/or searches that are common to that user, but different from the other members. A household account for a brother, sister, and grandmother may be created and each time one member requests a webpage from the online retailer's website, a personality CAPTCHA may be given to first, verify the user is a human-user and second, determine the likelihood of which one of the three members of the account is currently submitting a request. If, for example, the brother consistently searches and/or purchases products related to stamp collecting, the CAPTCHA rendering module, such as the security service 260 described and depicted in connection with FIG. 2, may provide a CAPTCHA directed towards stamp identification. If the user responds in an appropriate or predictable manner for the brother, the decision module may conclude that the user is a human-user and that the user is the brother.

When the user is determined to be the brother, the online retailer server may respond to the user's request for a webpage and may provide the wish list or suggested items directed toward the brother. If, on the other hand, the CAPTCHA challenge provided is related to stamp collecting and the user's response is uncharacteristic of the brother's typical responses or a response that could be interpreted as a bot, the decision module may determine that the user is a different member of the household, that the user is a bot, and/or that the user is possibly fraudulent. The decision module may provide a secondary CAPTCHA, which may, for example, be directed toward the other two members of the account using a different personality CAPTCHA, or may provide an inverse CAPTCHA to determine if the user is a bot, based on a correct response.

Further example embodiments include a CAPTCHA challenge using the product information service 270 described and depicted in connection with FIG. 2 may maintain a catalog of goods and/or services available with or by the online retailer. In some example embodiments, personality CAPTCHA challenges may be presented to a user in a manner that would suggest that the user is performing an improvement on the online catalog. For example, when a user transmits a response for a webpage, the webserver or component thereof of the online retailer may display a photograph of a gray jacket on a dark background and ask: "Is this shirt light gray or dark gray." At a later point in the user's session, the webserver would display a second CAPTCHA to confirm the user is a human-user based on their second response. For example, the second CAPTCHA may display the same gray shirt, but instead of a dark background, the gray shirt would be presented to the user on a light background of the user's GUI. Generally, a human-user will perceive the two shirts as different colors, such that the user's answers would be inconsistent if the user was a human-user.

In alternative example embodiments, the personality CAPTCHA could be used to detect levels of knowledge or expertise of a user. For example, a user well versed in answering certain types of problems may be repeatedly given such questions, and if the user appears to fail to solve a CAPTCHA that they normally answer correctly, the system or detection service may use this as a warning that the user is not the presumed user.

Figure 5B:
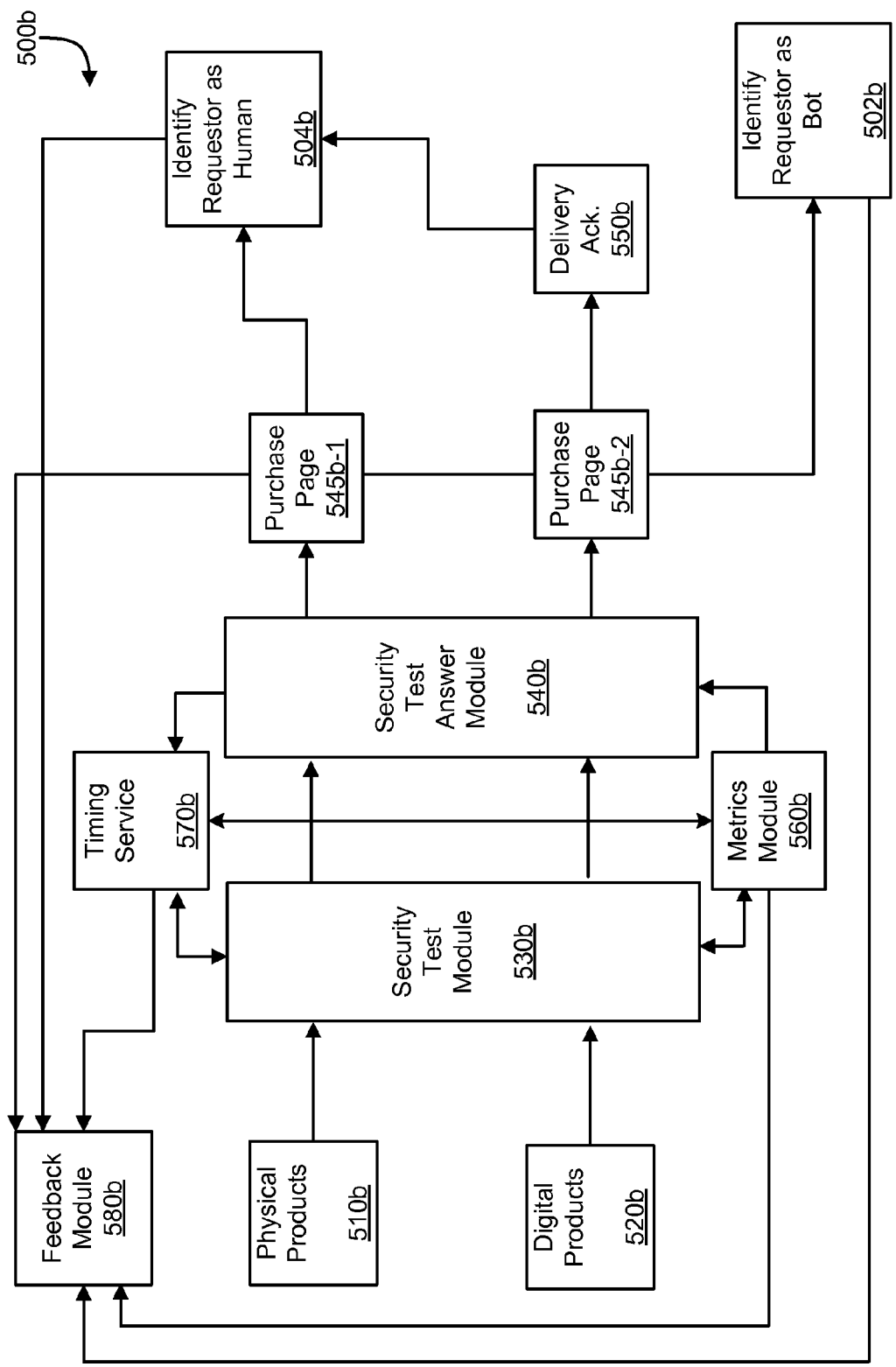
FIG. 5B is an illustrative example of a block diagram showing a pipeline in accordance with at least one embodiment.

FIG. 5B is a block diagram illustrating a pipeline 500*b* displaying a purchase process for digital products and physical products and how a requestor may be determined to be an automated-agent or a human-user based on the operations performed on an online retailer website according to example embodiments presented herein.

The example embodiment of FIG. 5B illustrates an online retailer; however, other websites or resources may similarly apply. When a requestor searches for a physical product 510*b* or a digital product 520*b* of the online retailer, the requestor may be provided with a security test, such as a personality test or inverse CAPTCHA test as described throughout, from a security test module 530*b*. The requestor's response to the CAPTCHA test is then monitored by a security test answer module 540*b* to determine the likelihood that the requestor is a human-user or a bot. Both the security test module and the test answer module may be operably interconnected with a timing service 570*b* and a metrics module 560*b*.

The timing service 570*b* may include a mechanism for determining the change in timing parameters for a requestor's response to a CAPTCHA. In place of or in addition to determining if the answer to the CAPTCHA is correct (generally indicating the requestor is an automated-agent), a timing parameter or change in timing parameter may be used to determine when a requestor is a human-user or a bot. For example, the human brain has evolved to detect the expression of anger faster than the expression for happiness. Using this knowledge, when a facial recognition inverse-CAPTCHA test is provided to a requestor displaying a face of an angry person, the timing mechanism may be used to determine the amount of time it takes the requestor to respond. This information may be compiled in a user profile, such a session-long profile or maintained profile, which may be updated each time the requestor responds to a CAPTCHA. When multiple CAPTCHA tests are provided (not shown) the timing mechanism may continue to detect the change in time it takes for a requestor to respond to certain types of tests; based at least in part on this data, a systems administrator may determine the likelihood that the requestor is a human-user. The timing data may further be part or all of a confidence score (as described in connection with FIGS. 3 and 8).

A metrics module 560*b* may be operably interconnected with the timing service, security test module, answer module, and feedback module in order to receive and provide data related to the requests and responses received. For example, the metrics module may include data related to the types of requests, the time of the requests, the geolocation information related to the requests, the types of resources requested, and other metrics commonly used or useful for example embodiments presented herein.

After the CAPTCHA has been analyzed, the requestor may be provided with the requested resource. For example, if the requestor was searching for a t-shirt, the requestor could then purchase the t-shirt on a purchase page 545*b*-1 of the website, or, if the requestor was searching for a digital product, such as an e-book, the requestor could then purchase the e-book on a purchase page 545*b*-2. A physical product purchased by the requestor would likely indicate that the requestor is a human-user 504*b*, and may be identified as such. If the requestor purchased a digital product, due to the speed of delivery (instantaneous or near-instantaneous), the requestor may not be clearly identifiable as a human-user or a bot. As such, a second operation may be necessary to add to a determination as to the type of requestor. For example, a delivery acknowledgment 550*b* may be used to further identify the requestor; if the product was not successfully delivered, the requestor may be identified as a bot 502*b*, if the product was successfully delivered, the requestor may be identified as a human-user.

A feedback module 580*b* may receive all data or information related to the requested resources, the requestor, the timing services, and all other modules that may be useful to determine the likelihood that the requestor is a human-user or an automated-agent, and may also be used to create and/or update user profiles in response to data received.

Figure 6:
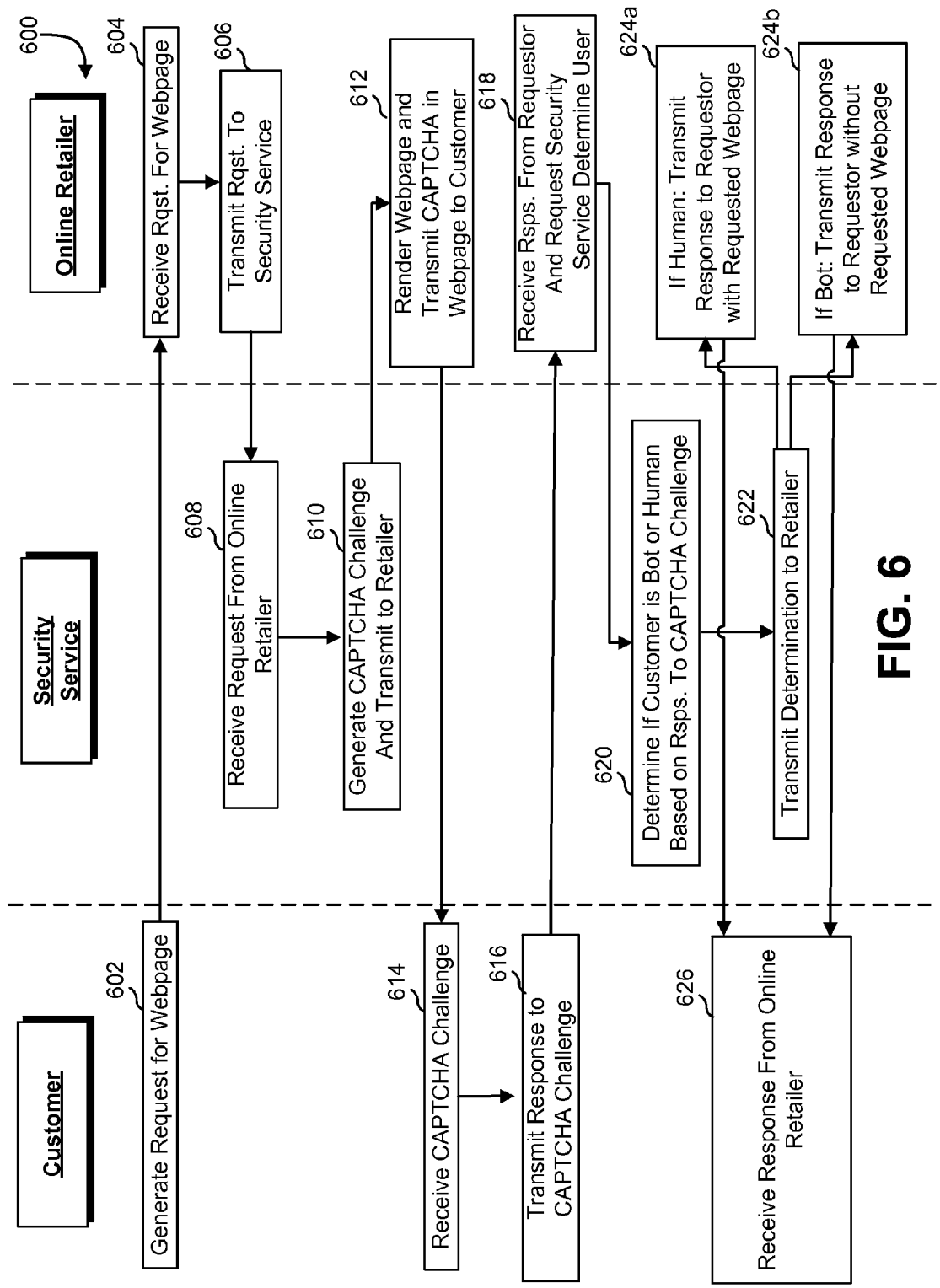
FIG. 6 is an illustrative example of a swim diagram for determining if a user is a human-user or an automated-agent in accordance with at least one embodiment.

FIG. 6 is a swim diagram illustrating a process 600 displaying interactions of a customer and an online retail website using a CAPTCHA challenge to detect automated-agents by implication that a customer is an automated-agent when the customer is able to solve the CAPTCHA challenge according to example embodiments presented herein. The process 600 may be performed by any suitable system, such as a user computing-device, the routing service 290, and the security service 260 as described and depicted above in connection with FIG. 2.

Returning to FIG. 6, the process 600 includes at step 602, a customer computing-device generating a request for a webpage and transmitting the request to the online retailer's server. At step 604, the retailer's server receives the request for the webpage and transmits a request to the security service at step 606. In step 608, the security service, which may be implemented in hardware, software, or cloud-based code executing on the online retailer's servers, receives the request from the retail server and generates a CAPTCHA challenge at step 610, which it returns to the retailer. For example, the challenge could be a specific challenge requested by the online retailer, a random challenge chosen from a library of CAPTCHAs, a newly created challenge done in real-time or near real-time based on the type of request received from the customer, or other methods of creating security tests currently known or hereinafter developed in the art as applicable to the embodiments presented herein.

At step 612, the retail server receives the generated CAPTCHA challenge from the security service, and transmits the CAPTCHA in a rendered webpage to the user. At step 614, the customer receives the rendered webpage with the CAPTCHA challenge from the retail server and, via the computing device or other user devices such as smartphones or tablets running a client, transmits a response to the CAPTCHA challenge to the online retailer at step 616. At step 618, the online retailer receives the customer's response and transmits a request to the security service to determine if the user is a bot or a human-user. At step 620, the security service is configured to determine if the customer is a bot or a human-user based at least in part on the customer's response to the challenge. For example, if the customer is able to solve the challenge correctly, the customer is generally considered a bot, especially when the challenge is an inverse CAPTCHA test as described above in connection with FIG. 4. In other embodiments, where a personality CAPTCHA test is generated for the customer, the security service may determine that the customer is a bot when the user fails a Wason Selection Test as described in connection with FIG. 4. The determination may further include information or data related to the requestor that has been accumulated using this, or a similar process, in a previous iteration, session, and/or time.

Returning to FIG. 6, at step 622, the security service transmits the determination to the retailer's server to provide if the customer is likely a human-user or an automated-agent. If the customer is determined to be a human-user, at step 624*a*, the online retailer may respond to the initial request for a webpage from step 602 by transmitting a response to the customer with the requested webpage. If, on the other hand, the customer is determined to be a bot, at step 624*b*, the online retailer may, from a server or other component, transmit a response to the bot without the request webpage or with an alternative message or response. At step 626, whether the customer is determined to be a bot or a human-user, the customer receives a response from the online retailer.

In alternative example embodiments, a determination that the user is a human user may not be initially discernable by the security service, in such cases a second or subsequent CAPTCHA challenge may be transmitted to the user for further testing. In addition, a security service may use additional criteria to determine if the user is a human-user or an automated-agent, for example, the service may use previously recorded data related to the user as additional evidence as to whether the user is a human-user or an automated-agent.

Figure 7:
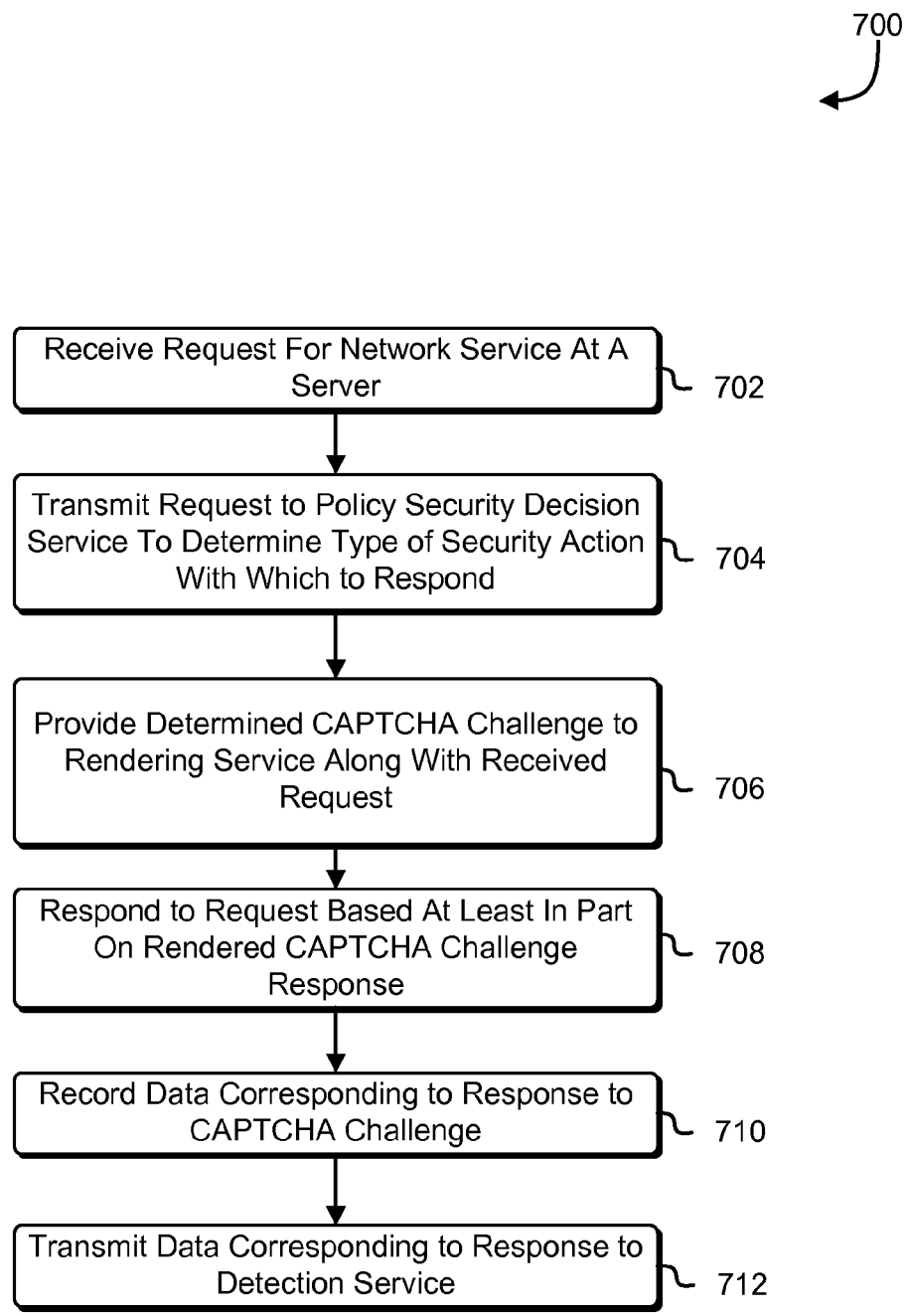
FIG. 7 is an illustrative example of a process for providing CAPTCHA challenges in accordance with at least one embodiment.

FIG. 7 shows an illustrative example of a process 700 that may be used to determine if the user is a human-user or an automated-agent based on a response to a security test. The process 700 may be performed by any suitable system, such as the request servers 115 or a component thereof described and depicted in connection with FIG. 1. Returning to FIG.

7, in an embodiment, the process 700 includes a server receiving a request for a network resource (702). The network resource may be a webpage of a website of an online retailer, such as an electronic marketplace. The request service may then transmit a request to a policy security decision service, such as the security service 260 described and depicted in connection with FIG. 2, which may be configured to determine a type of security action with which to respond to the user requesting the network service (704). The server, based at least in part of the determination of the security decision service, may provide a determined CAPTCHA challenge to a rendering service, at times along with the initial user request (706).

A rendering service, such as the rendering service 240 described and depicted in connection with FIG. 2, may render a webpage including a security test or may render the CAPTCHA challenge only and provide it to the server. The server may then be configured to respond to the initial request for network services based at least in part on the rendered CAPTCHA challenge response (708) and record data corresponding to any response received or determined based on the challenge (710). The server may further be configured to transmit any data corresponding to the response to a detection service, which may be configured to determine if the user is an automated-agent or a human-user (712).

Figure 8:
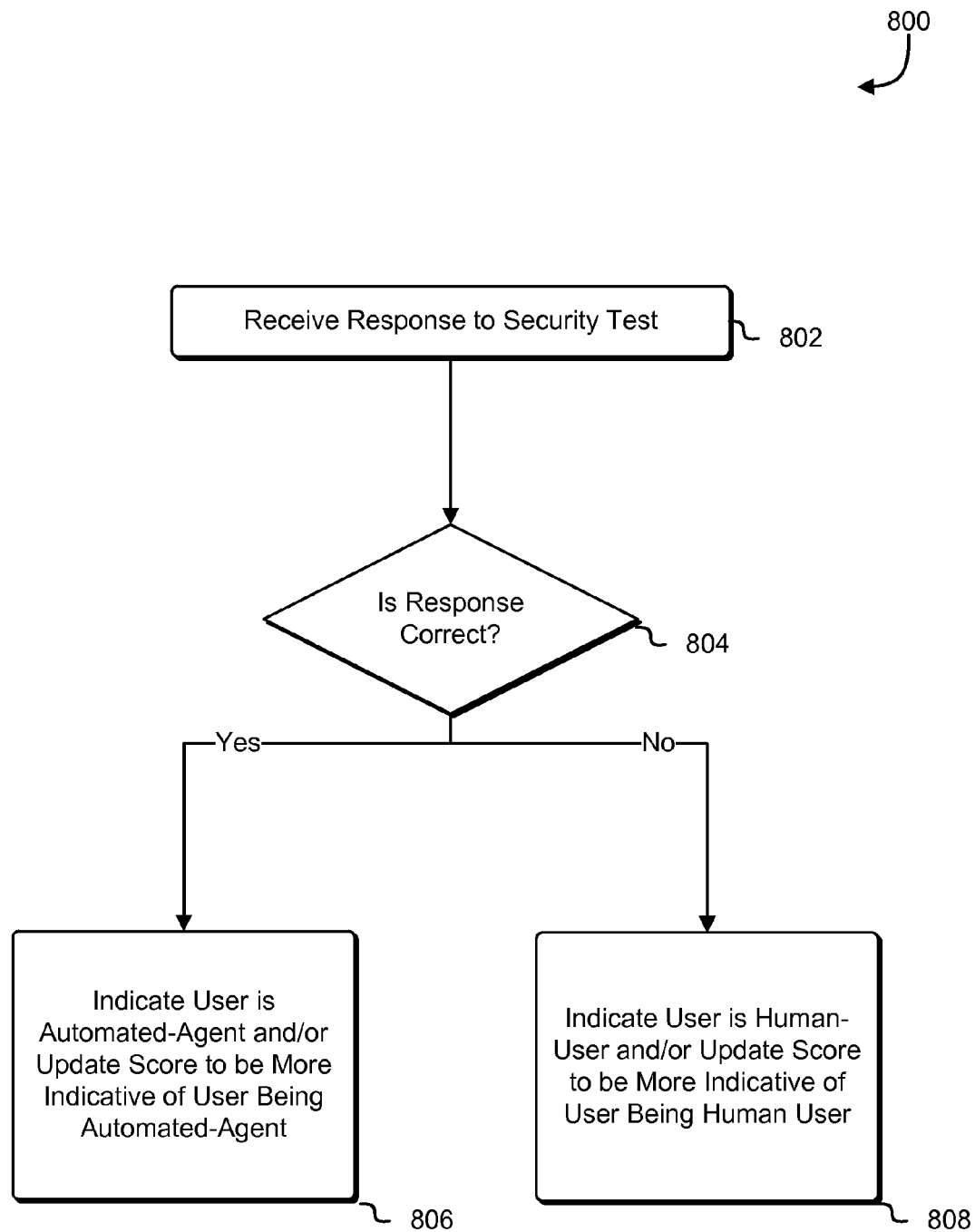
FIG. 8 is an illustrative example of a process for determining whether a user is a human-user or an automated-agent.

FIG. 8 shows an illustrative example of a process 800 that may be used to determine if the user is a human-user or an automated-agent based on a response to a security test. The process 800 may be performed by any suitable system, such as the request servers 115 or a component thereof described and depicted in connection with FIG. 1. Returning to FIG. 8, in an embodiment, the process 800 includes a server receiving a response to a security test (802) and determining if the response is a correct response (804). When the response is a correct response, an indication that the user is an automated-agent is made, or a score is updated that the user response is indicative of being a bot (806). However, when the response to the security test is incorrect, an indication that the user is a human-user is made, or a score is updated to reflect that the user response is indicative of being a human-user (808).

The answers to CAPTCHAs may include metrics such as how much time the user used to answer the test, if the user appears to be guessing, etc. As a user answers more than one challenge-response test, an aggregate performance score may be updated to include the level of performance, amount of success, rate of success, and other details related to the user's responses in order to maintain a method of scoring the user. The aggregate performance score may be compared to a reference performance score, which could be a score that is the expected outcome of the test. For example, the reference score could be what a computer would be expected to receive or it could be what a human-user is expected to receive based on the problem. In other words, the reference score can be used to ask: Did this entity act like an automated-agent? And ask: Did this entity act like a human? There is the possibility that the user appears as both a bot and a human-user, or perhaps neither. As such, the reference score may be multi-tiered to determine if additional problems should be provided to the user to make a more confident determination as the likelihood that the user is a human-user or not.

In some embodiments, a reference performance score and/or aggregate performance score may be calculated in real-time or near real-time, such that a challenge-response problem may be created new or provided randomly and the scores may be determined in real-time. In other embodiments, the challenge-response problems may be pre-selected from collections or libraries of problems that have exiting or pre-determined reference performance sores that have already been calculated as to what is expected from an automated-agent and what is expected from a human-user in terms of performance.

A confidence score, reference performance score, or aggregate performance score may be a Boolean where failure of the interaction event data to meet a predetermined criterion can make the Boolean false. The Boolean can be based on true or false (1 or 0) logic or based on fuzzy logic or a continuum of values. It can also be a formula based at least in part on inputs, where at least some of the inputs correspond to whether and/or how well various interaction event data types satisfy corresponding criteria. A human/agent score may simply be a value in a range of values, where a higher value corresponds to a greater likelihood that a user is a human user. Alternative methods of determining a confidence score may include calculating the confidence score according to machine-learning algorithms, constraint-based learning algorithms, decision-tree learning, probabilistic methods, classification algorithms or other such rules or processes currently known or hereinafter developed.

The theory that human-users are more successful with certain framings is known in such areas as cognitive psychology and evolutionary psychology for instance; however, the example embodiments presented herein improve upon the technical fields of website protection. For example, by applying concepts from cognitive psychology, negative CAPTCHAs can be used to detect automated-agents or used for Turing tests (reverse Turing tests) in general and further improve the current Turing tests and CAPTCHAs by taking advantage of human cognition and how a person understands and acts in the world.

Figure 9:
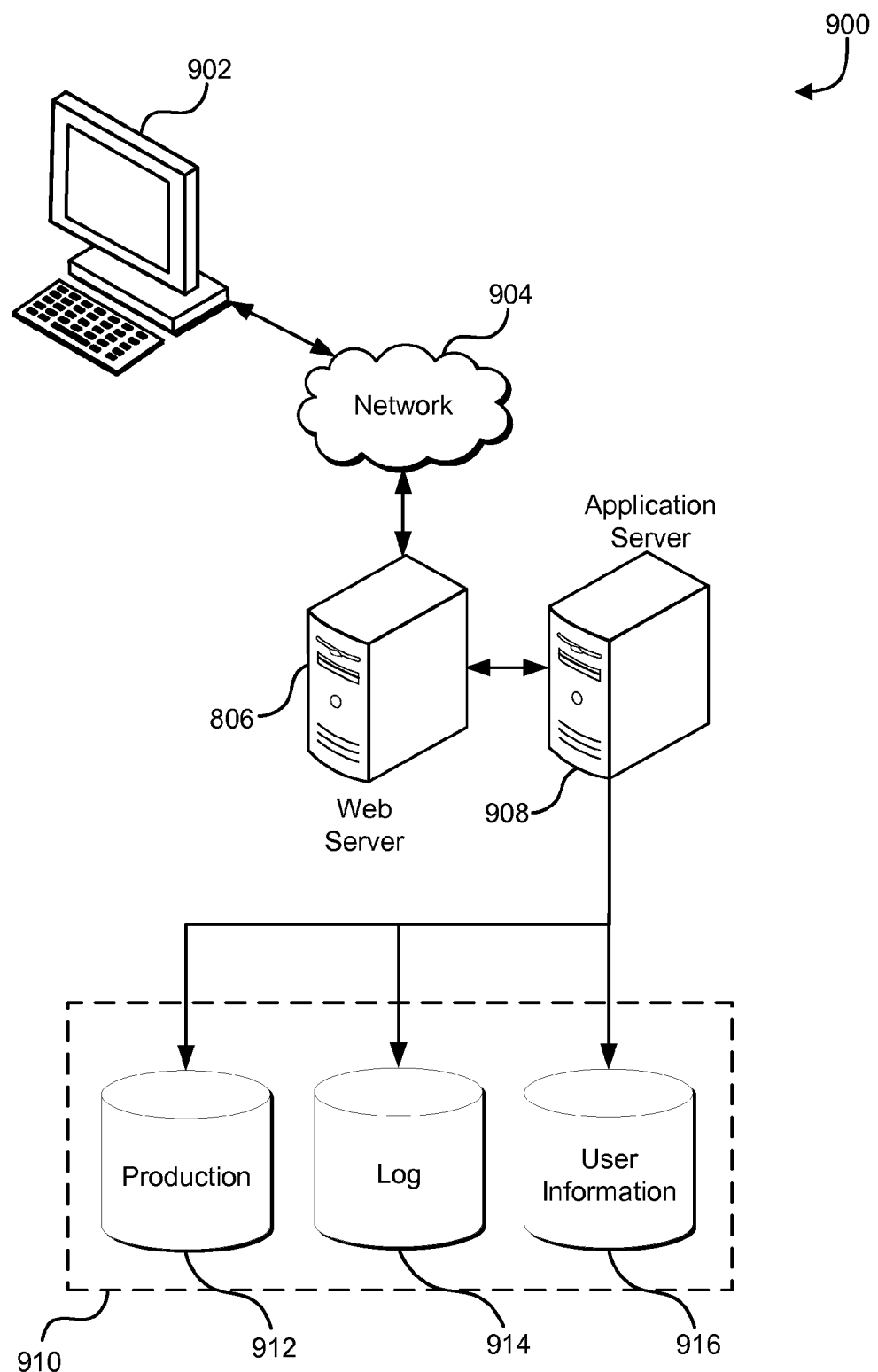
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a webserver 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the webserver in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the webserver using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a webpage that the user is able to view via a browser on the user device 902. Information for a particular item of interest can be viewed in a dedicated page or window of the browser. It should be noted, however, that embodiments of the present disclosure are not necessarily limited to the context of webpages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a webserver, the webserver can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Embodiments of the present disclosure can be described in view of the following clauses:

1. A computer-implemented method for identifying automated-agents, comprising:
   under the control of one or more computer systems configured with executable instructions,
   receiving a request for a webpage;
   selecting a security check from a plurality of security checks, the selected security check configured to solicit input;
   providing, in response to the request for the webpage, the selected security check;
   receiving information encoding a response to the selected security check;
   verifying that the response to the selected security check is indicative of a response sent by an automated-agent, the verification being determined at least in part based on the response indicating a correct answer to the selected security questions; and
   performing one or more actions in accordance with the request being sent by an automated-agent in response to a correct answer to the selected security check.

2. The computer-implemented method of clause 1, further comprising characterizing the request for the webpage as a request from an automated-agent when the response is determined to be the correct answer to the selected security check.

3. The computer-implemented method of clause 1 or 2, further comprising rendering a webpage containing different content than the requested webpage when the request is characterized as a request from an automated-agent.

4. The computer-implemented method of any of clauses 1 to 3, further comprising: receiving a second request for a webpage;
   selecting a second security check from a plurality of security checks, the selected second security check configured to solicit input;

provide, in response to the second request for the webpage, the selected second security check;

receiving information encoding a response to the selected second security check;

determining that the response indicates an incorrect answer to the selected second security check; and blocking access to at least some information that the one or more computer systems are configured to provide in response to an incorrect answer to the selected second security check.

5. The computer-implemented method of any of clauses 1 to 4, wherein the one or more operations include denying access to one or more resources, monitoring traffic of one or more requestors, or recording the request.

6. A system, comprising:
at least one computing device configured to implement one or more services, wherein the one or more services are configured to:
obtain, in response to a request from a requestor, a challenge-response problem to include in response to the request, the response being configured to include the challenge-response problem;
determine, after transmitting the response to the request, if the challenge-response problem was correctly completed;
verify that the response to the challenge-response problem indicates that the response was sent by an automated-agent, the verification based at least in part on the determinations that the challenge-response problem was correctly completed; and
perform one or more operations as a result of the response to the challenge-response problem being associated with the requestor being an automated-agent.

7. The system of clause 6, wherein the challenge-response problem includes a time parameter by which a response to the challenge-response problem must be completed.

8. The system of clause 6 or 7, wherein the one or more services are further configured to:
receive a second request for one or more resources, the second request including a successful solution to the challenge-response problem;
identify the second request as originating from an automated-agent; and
limit or block access to the one or more resources in response to the second request, based at least in part on identifying the second request as originating from the automated-agent.

9. The system of clause 8, wherein the one or more actions in response to the successful solution to the challenge-response problem include providing a different one or more resources than the one or more resources requested by the second request.

10. The system of any of clauses 6 to 9, wherein performing one or more actions includes categorizing a response to the challenge-response problem, categorizing data related to the requestor, categorizing data related to one or more resources, categorizing data of a time parameter used in the challenge-response problem, or a combination thereof.

11. The system of any of clauses 6 to 10, wherein the one or more services are further configured to provide a second challenge-response problem after determining the challenge-response problem was successfully completed, wherein the second challenge-response problem includes exact logic as the challenge-response problem presented in a different manner.

12. The system of clause 11, wherein the one or more service are further configured to characterize the requestor as an automated-agent when the second challenge-response problem was successfully completed in a same manner as the challenge-response problem.

13. The system of any of clauses 6 to 12, wherein the challenge-response problems are based at least in part on psycholinguistics, evolutionary psychology, color psychology, or a combination thereof.

14. A non-transitory computer-readable storage medium having stored thereon executable instructions that, when executed by one or more processors of a computer system, cause the computer system to at least:
transmit a challenge-response problem, the challenge-response problem being a security check to determine if a requestor is an automated-agent or a human-user;
receive data indicating a response to the challenge-response problem, the data indicating a correct response to the challenge-response problem;
determine that the correct response to the challenge-response problem identifies the requestor as an automated-agent; and
perform one or more operations as a result of the response to the challenge-response problem identifies the requestor as an automated-agent.

15. The non-transitory computer-readable storage medium of clause 14, wherein the instructions further comprise instructions that, when executed by the one or more processors, cause the computer system to select the challenge-response problem from a plurality of challenge-response problems tested to be more frequently solved correctly by automated agents than by human users.

16. The non-transitory computer-readable storage medium of clause 14 or 15, wherein the instructions further comprise instructions that, when executed by the one or more processors, cause the computer system to provide the challenge-response problem for display on a graphical user interface (GUI) of a user device.

17. The non-transitory computer-readable storage medium of clause 16, wherein the instructions that cause the computer system to display the challenge-response problem on a GUI further include instructions that cause the computer system to display the challenge-response problem in a modal window.

18. The non-transitory computer-readable storage medium of any of clauses 14 to 17, wherein the instructions further comprise instructions that, when executed by the one or more processors, cause the computer system to maintain a database of known human-users, known automated-agents, or both, based, at least in part, on past responses to challenge-response problems.

19. The non-transitory computer-readable storage medium of clause 18, wherein the instructions that cause the computer system to maintain a database further include instructions that cause the computer system to maintain a profile of one or more users based, at least in part, on a type of the challenge-response problems that the user consistently solves correctly such that a user is classified as a specific user of an account.

20. The non-transitory computer-readable storage medium of any of clauses 14 to 19, wherein the instructions further comprise instructions that, when executed by the one or more processors, cause the computer system to:
monitor a type of product, service, or both, searched for by the user; determine a mood of the user; and
provide the challenge-response problem that matches the mood of the user, is complementary to the mood of the user, or is made to change the mood of the user.

21. The non-transitory computer-readable storage medium of any of clauses 14 to 20, wherein the instructions that cause the computer system to determine a mood of the user further include instructions that cause the computer system to provide the challenge-response problem to the user in a form of a game.

22. The non-transitory computer-readable storage medium of clause 21, wherein the game is configured to provide the user with a reward as a result of the user being determined to be a human-user.

23. The non-transitory computer-readable storage medium of any of clauses 14 to 22, wherein the instructions further comprise instructions that, when executed by the one or more processors, cause the computer system to determine the challenge-response problem are based at least in part on a request for one or more resources.

24. The non-transitory computer-readable storage medium of any of clauses 14 to 23, wherein the data received indicating the response to the challenge-response problem is recorded, and wherein the data is associated with a profile of a requestor.

25. A computer-implemented method for identifying automated-agents, comprising:
under the control of one or more computer systems configured with executable instructions,
providing, in connection with navigation of a website by an entity, a collection of security checks to the entity;
receiving a collection of responses comprising at least a first response to a first security check of the collection of security checks and a second response to a second security check of the collection of security checks;
calculating, based at least in part on the received collection of responses, an aggregate performance score for the entity;
determining a reference performance score for the collection of security checks;
determining, based at least in part on the aggregate performance score and the reference performance score, information indicative of whether the entity is an automated-agent or a human-user; and
performing one or more operations as a result of the determined information.

26. The computer-implemented method of clause 25, wherein providing the collection of security checks to the entity includes providing one or more security checks over multiple requests for webpages of the website.

27. The computer-implemented method of clause 25 or 26, wherein the collection of responses includes at least one metric related to one or more of the responses in the collection of responses.

28. The computer-implemented method of any of clauses 25 to 27, wherein the reference performance score includes a response suggestive of a human-user response or a response suggestive of an automated-agent response.

29. The computer-implemented method of any of clauses 25 to 28, wherein the one or more operations include denying access to one or more resources, limiting access to one or more resources, monitoring traffic of the entity, or recording data associated with the entity.

30. A system, comprising:
at least one computing device configured to implement one or more services, wherein the one or more services are configured to:
receive, from an entity, a collection of responses comprising at least a first response to a first security check of a collection of security checks and a second response to a second security check of the collection of security checks;
determine, based at least in part on the received collection of responses and reference information for the collection of security checks, information indicative of whether the entity is an automated-agent; and
perform one or more operations based at least in part on the determined information.

31. The system of clause 30, wherein the collection of security checks includes challenge-response problems based at least in part on evolutionary psychology, cognitive psychology, psycholinguistics, or color psychology.

32. The system of clause 30 or 31, wherein the first security check or the second security check is created in real-time or near real-time, wherein the first security check or the second security check is created without intentional delay, given processing limitations of the system, given time required to accurately receive the data, or given time based on an input data stream.

33. The system of any of clauses 30 to 32, wherein the information indicative of whether the entity is an automated-agent includes the collection of responses being equally correct or being equally incorrect.

34. The system of any of clauses 30 to 33, wherein determining information indicative of whether the entity is an automated-agent further includes identifying at least one pattern in the collection of responses.

35. The system of any of clauses 30 to 34, wherein the first response is submitted according to a time parameter in the first security check and the second response is submitted according to a time parameter in the second security check.

36. The system of any of clauses 30 to 35, wherein the reference information includes previous requests and responses associated with the entity, the previous requests and responses being stored as at least part of a profile for the entity.

37. The system of clause 36, wherein the one or more services are further configured to:
identify the profile for the entity; and
configure access to the at least one resource corresponding to the profile.

38. The system of any of clauses 30 to 37, wherein the one or more operations include denying access to one or more resources, limiting access to one or more resources, monitoring traffic of the entity, or recording data associated with the entity.

39. A non-transitory computer-readable storage medium having stored thereon executable instructions that, when executed by one or more processors of a computer system, cause the computer system to at least:
receive, from an entity, a response to a security check, the security check selected from a plurality of security checks provided to the entity;
update, based at least in part on the received response, a score for the entity for the plurality of security checks;
compare the updated score for the entity to a reference score; and
perform one or more operations as a result of the comparison of the updated score relative to the reference score.

40. The non-transitory computer-readable storage medium of clause 39, wherein the reference score indicates a response expected from an automated-agent or a response expected from a human-user.

41. The non-transitory computer-readable storage medium of clause 39 or 40, wherein the instructions further comprise instructions that, when executed by the one or more processors, cause the computer system to identify information related to the entity, wherein information related to the entity includes at least one previous request transmitted by the entity or at least one response transmitted by the entity.

42. The non-transitory computer-readable storage medium of clause 41, wherein the instructions that cause the computer system to identify the information related to the entity further include instructions that cause the computer system to maintain the updated score for the entity as a profile.

43. The non-transitory computer-readable storage medium of any of clauses 39 to 42, wherein the instructions further comprise instructions that, when executed by the one or more processors, cause the computer system to determine a reference score for individual security checks from the plurality of security checks.

44. The non-transitory computer-readable storage medium of clause 43, wherein the instructions that cause the computer system to determine the reference score further include instructions that cause the computer system to:
   compare the updated score for the entity to the reference score for the security check from the plurality of security checks; and
determine, at least in part on the comparison, whether the updated score is indicative of the entity being an automated-agent.

45. The non-transitory computer-readable storage medium of any of clauses 39 to 44, wherein the instructions further comprise instructions that, when executed by the one or more processors, cause the computer system to determine a confidence score for the entity, the confidence score being indicative of whether the entity is a human-user or an automated-agent.

46. The non-transitory computer-readable storage medium of clause 45, wherein the instructions that cause the computer system to determine the confidence score for the entity further include instructions that cause the computer system to configure, in accordance with the confidence score being indicative of the entity being a human-user, access to the at least one resource.

47. The non-transitory computer-readable storage medium of any of clauses 39 to 46, wherein the reference score is associated with a profile of the entity and wherein the instructions further comprise instructions that, when executed by the one or more processors, cause the computer system to determine, based at least in part on the comparison of the updated score relative to the reference score, when the entity is the entity associated with the profile.

48. The non-transitory computer-readable storage medium of clause 47, wherein the instructions that cause the computer system to determine when the entity is the entity associated with the profile and the entity is a first entity, further include instructions that cause the computer system to detect a second entity not associated with the profile of the first entity.

49. The non-transitory computer-readable storage medium of any of clauses 39 to 48, wherein the one or more operations include denying access to one or more resources, limiting access to one or more resources, monitoring traffic of the entity, or recording data associated with the entity.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for identifying automated-agents, comprising:
    under the control of one or more computer systems configured with executable instructions,
        receiving a request for a webpage;
        selecting a security check from a plurality of security checks, the selected security check receiving input;
        providing, in response to the request for the webpage, the selected security check to cause a challenge presented by the selected security check to be humanly perceivable in a user interface, the challenge being based at least in part on psycholinguistics, evolutionary psychology, color psychology, or a combination thereof;
        receiving information that includes a response to the challenge of the selected security check;
        verifying that the response to the selected security check is indicative of a response sent by an automated-agent, the verification being determined at least in part based on the response indicating a correct answer to the selected security questions; and
        performing one or more actions in accordance with the request being sent by an automated-agent in response to a correct answer to the selected security check.

2. The computer-implemented method of claim 1, further comprising characterizing the request for the webpage as a request from an automated-agent when the response is determined to be the correct answer to the selected security check.

3. The computer-implemented method of claim 2, further comprising rendering a webpage containing different content than the requested webpage when the request is characterized as a request from an automated-agent.

4. The computer-implemented method of claim 1, further comprising:
    receiving a second request for a webpage;
    selecting a second security check from a plurality of security checks, the selected second security check that receives input;
    provide, in response to the second request for the webpage, the selected second security check;
    receiving information that includes a response to the selected second security check;
    determining that the response indicates an incorrect answer to the selected second security check; and
    blocking access to at least some information that the one or more computer systems that provide in response to an incorrect answer to the selected second security check.

5. The computer-implemented method of claim 1, wherein the one or more operations include denying access to one or more resources, monitoring traffic of one or more requestors, or recording the request.

6. A system, comprising:
    at least one computing device that implements one or more services, wherein the one or more services:
        obtain, in response to a request from a requestor, a challenge-response problem to include in response to the request, wherein the challenge-response problem to be humanly perceivable in a user interface, the challenge-response problem being based at least in part on psycholinguistics, evolutionary psychology, color psychology, or a combination thereof;
        determine, after transmitting the response to the request, if the challenge-response problem was correctly completed;
        verify that the response to the challenge-response problem indicates that the response was sent by an automated-agent, the verification based at least in part on a determination that the challenge-response problem was correctly completed; and
        perform one or more operations as a result of the response to the challenge-response problem being associated with the requestor being an automated-agent.

7. The system of claim 6, wherein the challenge-response problem includes a time parameter by which a response to the challenge-response problem must be completed.

8. The system of claim 6, wherein the one or more services further:
    receive a second request for one or more resources, the second request including a successful solution to the challenge-response problem;
    identify the second request as originating from an automated-agent; and
    limit or block access to the one or more resources in response to the second request, based at least in part on identifying the second request as originating from the automated-agent.

9. The system of claim 8, wherein the one or more actions in response to the successful solution to the challenge-response problem include providing a different one or more resources than the one or more resources requested by the second request.

10. The system of claim 6, wherein performing one or more actions includes categorizing a response to the challenge-response problem, categorizing data related to the requestor, categorizing data related to one or more resources, categorizing data of a time parameter used in the challenge-response problem, or a combination thereof.

11. The system of claim 6, wherein the one or more services are further configured to provide a second challenge-response problem after determining the challenge-response problem was successfully completed, wherein the second challenge-response problem includes exact logic as the challenge-response problem presented in a different manner.

12. The system of claim 11, wherein the one or more services further characterize the requestor as an automated-agent when the second challenge-response problem was successfully completed in a same manner as the challenge-response problem.

13. A non-transitory computer-readable storage medium having stored thereon executable instructions that, when executed by one or more processors of a computer system, cause the computer system to at least:
- transmit a challenge-response problem, the challenge-response problem being a security check to determine if a requestor is an automated-agent or a human-user, wherein the security check to cause a challenge presented by the security check to be humanly perceivable in a user interface, the challenge being based at least in part on psycholinguistics, evolutionary psychology, color psychology, or a combination thereof;
- receive data indicating a response to the challenge-response problem, the data indicating a correct response to the challenge-response problem;
- determine that the correct response to the challenge-response problem identifies the requestor as an automated-agent; and
- perform one or more operations as a result of the response to the challenge-response problem that identifies the requestor as an automated-agent.

14. The non-transitory computer-readable storage medium of claim 13, wherein the instructions further comprise instructions that, when executed by the one or more processors, cause the computer system to select the challenge-response problem from a plurality of challenge-response problems tested to be more frequently solved correctly by automated agents than by human users.

15. The non-transitory computer-readable storage medium of claim 13, wherein the instructions further comprise instructions that, when executed by the one or more processors, cause the computer system to provide the challenge-response problem for display on a graphical user interface (GUI) of a user device.

16. The non-transitory computer-readable storage medium of claim 15, wherein the instructions that cause the computer system to display the challenge-response problem on a GUI further include instructions that cause the computer system to display the challenge-response problem in a modal window.

17. The non-transitory computer-readable storage medium of claim 13, wherein the instructions further comprise instructions that, when executed by the one or more processors, cause the computer system to maintain a database of known human-users, known automated-agents, or both, based, at least in part, on past responses to challenge-response problems.

18. The non-transitory computer-readable storage medium of claim 17, wherein the instructions that cause the computer system to maintain a database further include instructions that cause the computer system to maintain a profile of one or more users based, at least in part, on a type of the challenge-response problems that the user consistently solves correctly such that a user is classified as a specific user of an account.

19. The non-transitory computer-readable storage medium of claim 13, wherein the instructions further comprise instructions that, when executed by the one or more processors, cause the computer system to:
- monitor a type of product, service, or both, searched for by the user;
- determine a mood of the user; and
- provide the challenge-response problem that matches the mood of the user, is complementary to the mood of the user, or is made to change the mood of the user.

20. The non-transitory computer-readable storage medium of claim 13, wherein the instructions that cause the computer system to determine a mood of the user further include instructions that cause the computer system to provide the challenge-response problem to the user in a form of a game.

21. The non-transitory computer-readable storage medium of claim 20, wherein the game provides the user with a reward as a result of the user being determined to be a human-user.

22. The non-transitory computer-readable storage medium of claim 13, wherein the instructions further comprise instructions that, when executed by the one or more processors, cause the computer system to determine the challenge-response problem based at least in part on a request for one or more resources.

23. The non-transitory computer-readable storage medium of claim 13, wherein the data received indicating the response to the challenge-response problem is recorded, and wherein the data is associated with a profile of a requestor.

* * * * *